(12) United States Patent
Frenger et al.

(10) Patent No.: US 11,290,925 B2
(45) Date of Patent: Mar. 29, 2022

(54) MANAGING RADIO LINK PROBLEMS BETWEEN A WIRELESS DEVICE AND A SERVING NODE IN A WIRELESS COMMUNICATION SYSTEM

(71) Applicant: Telefonaktiebolaget LM Ericsson (publ), Stockholm (SE)

(72) Inventors: Pål Frenger, Linköping (SE); Erik Eriksson, Linköping (SE); Martin Hessler, Linköping (SE); Pradeepa Ramachandra, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 5 days.

(21) Appl. No.: 15/765,378

(22) PCT Filed: Oct. 5, 2015

(86) PCT No.: PCT/SE2015/051045
§ 371 (c)(1),
(2) Date: Apr. 2, 2018

(87) PCT Pub. No.: WO2017/061908
PCT Pub. Date: Apr. 13, 2017

(65) Prior Publication Data
US 2018/0310205 A1    Oct. 25, 2018

(51) Int. Cl.
*H04W 36/00* (2009.01)
*H04W 76/18* (2018.01)
(Continued)

(52) U.S. Cl.
CPC ....... *H04W 36/0033* (2013.01); *H04W 24/04* (2013.01); *H04W 76/10* (2018.02);
(Continued)

(58) Field of Classification Search
CPC ............ H04W 36/08; H04W 36/0055; H04W 36/0085; H04W 36/0088; H04W 48/20;
(Continued)

(56) References Cited

U.S. PATENT DOCUMENTS

| 8,768,305 B1 | 7/2014 | Singh et al. |
| 2012/0142336 A1* | 6/2012 | Van Phan ......... H04W 36/0033 455/423 |

(Continued)

FOREIGN PATENT DOCUMENTS

| CN | 101374321 A | 2/2009 |
| CN | 101616408 A | 12/2009 |

(Continued)

*Primary Examiner* — Romani Ohri
(74) *Attorney, Agent, or Firm* — Murphy, Bilak & Homiller, PLLC

(57) ABSTRACT

Methods and arrangements for managing a problem with a first radio link (121) between a wireless device (115) and a serving network node (110) comprised in a wireless communication network (100). The wireless communication network (100), e.g. a serving network node (110) therein sends (201a; 301, 401a; 501; 601) first information to the wireless device (115). The first information comprises a first identifier and informs the wireless device (115) that the first identifier, if received from a candidate network node (110; 111a; 111b), means that the serving network node (110) has authorized setting up a working radio link (121; 122a; 122b), without said problem, between the wireless device (115) and said candidate node (110; 111a; 111b).

23 Claims, 11 Drawing Sheets

(51) Int. Cl.
*H04W 76/10* (2018.01)
*H04W 76/19* (2018.01)
*H04W 24/04* (2009.01)
*H04W 48/16* (2009.01)

(52) U.S. Cl.
CPC ........... *H04W 76/18* (2018.02); *H04W 76/19* (2018.02); *H04W 48/16* (2013.01)

(58) Field of Classification Search
CPC ........................ H04W 56/001; H04W 28/08; H04W 36/0033
See application file for complete search history.

(56) References Cited

U.S. PATENT DOCUMENTS

| | | | | |
|---|---|---|---|---|
| 2012/0190365 A1* | 7/2012 | Jeong | .................... | H04W 36/30 455/436 |
| 2013/0023269 A1* | 1/2013 | Wang | ................ | H04W 36/0072 455/436 |
| 2013/0343296 A1* | 12/2013 | Dinan | .................... | H04L 27/26 370/329 |
| 2016/0112937 A1* | 4/2016 | Nagasaka | ........... | H04W 84/045 455/434 |
| 2017/0171784 A1* | 6/2017 | Mitsui | .................. | H04W 36/08 |

FOREIGN PATENT DOCUMENTS

| | | |
|---|---|---|
| CN | 104641683 A | 5/2015 |
| EP | 2028890 A1 | 2/2009 |
| EP | 2154912 A1 | 2/2010 |
| EP | 2273818 A1 | 1/2011 |
| EP | 2343947 A1 | 7/2011 |
| JP | 2010524329 A | 7/2010 |
| JP | 2011193114 A | 9/2011 |
| JP | 2016515338 A | 5/2016 |
| WO | 2008038093 A2 | 4/2008 |
| WO | 2008114183 A1 | 9/2008 |
| WO | 2010017961 A1 | 2/2010 |
| WO | 2013107391 A1 | 7/2013 |
| WO | 2014111499 A1 | 7/2014 |
| WO | 2014137944 A2 | 9/2014 |
| WO | 2015069740 A1 | 5/2015 |

* cited by examiner

MANAGING RADIO LINK PROBLEMS BETWEEN A WIRELESS DEVICE AND A SERVING NODE IN A WIRELESS COMMUNICATION SYSTEM

TECHNICAL FIELD

Embodiments herein relate to methods and network nodes in a wireless communication network, e.g. telecommunication network, for managing a problem with a radio link between a wireless device and a serving network node comprised in the wireless communication network.

BACKGROUND

Communication devices such as wireless communication devices, that simply may be named wireless devices, may also be known as e.g. user equipments (UEs), mobile terminals, wireless terminals and/or mobile stations. A wireless device is enabled to communicate wirelessly in a cellular communication network, wireless communication system, or radio communication system, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user.

The wireless device may be, for example, portable, pocket-storable, hand-held, computer-comprised, or vehicle-mounted mobile device, enabled to communicate voice and/or data, via the RAN, with another entity, such as another wireless device or a server.

The cellular communication network covers a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site provides radio coverage for one or more cells. A cell is thus associated with a geographical area where radio coverage for that cell is provided by the base station at the base station site. Cells may overlap so that several cells cover the same geographical area. By the base station providing or serving a cell is meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile).

In 3rd Generation Partnership Project (3GPP) Long Term Evolution (LTE), base stations, which may be referred to as eNodeBs or eNBs, may be directly connected to other base stations and may be directly connected to one or more core networks.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The 3GPP has undertaken to evolve further the UTRAN and GSM based radio access network technologies, for example into evolved UTRAN (E-UTRAN) used in LTE.

The expression downlink (DL) is used for the transmission path from the base station to the wireless device. The expression uplink (UL) is used for the transmission path in the opposite direction i.e. from the wireless device to the base station.

Work is ongoing with designing a baseline for the next generation wide area networks, which may be referred to as fifth generation (5G). A design principle under consideration for 5G wireless communication networks is to base it on an ultra-lean design. This implies that "always on signals" shall be avoided in the network as much as possible. The expected benefit from this design principle is expected to be significantly lower network energy consumption, better scalability, higher degree of forward compatibility, lower interference from system overhead signals and consequently higher throughput in low load scenario, and also improved support for user centric beam-forming.

Advanced Antenna Systems (AAS) is an area where technology has advanced significantly in recent years and where we also foresee a rapid technology development in the years to come. Hence it is natural to assume that advanced antenna systems in general and massive Multiple Input Multiple Output (MIMO) transmission and reception in particular, will be a cornerstone in a future 5G wireless communication network.

As beam-forming becomes increasingly popular and capable it becomes natural to use it not only for transmission of data but also for transmission of control information. This is one motivation behind the relatively new control channel in LTE known as enhanced Physical Downlink Control CHannel (ePDCCH). When a control channel is beam-formed, the cost of transmitting the overhead control information can be reduced due to the increased link budget provided by additional antenna gain. This is a good property that likely will be utilized also for 5G, perhaps to an even larger degree than what is possible in the currently in LTE.

When there is a wireless communication network that is "ultra-lean", as described above, and that uses massive beam-forming, a conventional definition of a Radio Link Failure (RLF) may no longer be relevant. When no data is transmitted in either uplink or downlink, there is no signal that can be used to detect that the radio link is failing, and mobility reference signals may not always, or at least not sufficiently, be present in an ultra-lean network. For example, RLF in a conventional meaning is not usable in a network based on a design principle that the radio link will only be present when data is transmitted. A wireless device, such as a user terminal, may move out of coverage between packet transmission bursts without anyone noticing. If there is also beam-formed control-information, it may not even be possible to reach an intended receiving wireless device once it is desirable to continue data transmission. Similarly, when a wireless device wants to send data, it may not be able to communicate this to the network and be scheduled. In such a scenario, a conventional solution would be that the wireless device has to perform a new random access procedure, but this is associated with a significant delay and signalling overhead cost.

SUMMARY

In view of the problems indicated above, an object is to provide one or more improvements with regard to how radio link problems are managed in a wireless communication network. Wireless communication networks that may be of particular interest are such where signals for detecting a failure and/or a problem with a radio link are not sufficiently available, such as in the case of so called "ultra-lean" networks that, for example, are expected to be used for 5G wireless communication networks. It is e.g. particularly desirable that the improvements enable less delay and/or a less signalling overhead cost than when performing a conventional random access procedure.

To distinguish from conventional radio link failure, typically abbreviated RLF and that may have a special meaning, herein the term Radio Link Problem (RLP) is used instead. RLP may be considered as a new type of event. RLP may be an event indicating that some kind of problem with a previously working radio link has been experienced and/or detected, which problem relate to communication over a radio link between a wireless device and a serving network node. The problem may e.g. relate to absence of expected data and/or signal, and/or some deterioration of ongoing communication over the radio link, which deterioration is at an unacceptable level, e.g. worse that a certain level that may be predefined and/or predetermined. The serving network node is a network node that presently is assigned to serve and/or that last served the wireless device over the radio link and/or may be a network node currently expected to serve the wireless device when and/or if there is data to be communicated to and/or from the wireless device. A detected RLP may e.g. indicate that there is some mismatch between a serving network node and a wireless device associated with the radio link. A RLP may e.g. be caused by a serving network node antenna pointing in a direction where the signal does not reach an intended wireless device. A RLP may also e.g. be caused by an antenna configuration in a wireless device that is not tuned in properly towards an intended serving network node.

According to a first aspect of embodiments herein, the object is achieved by a method, performed by a wireless communication network, e.g. a network node thereof, for managing a problem with a first radio link between a wireless device and the serving network node. In some embodiments, said network node is the serving network node. The wireless communication network sends first information to the wireless device. The first information comprises a first identifier and informs the wireless device that the first identifier, if received from a candidate network node, means that the serving network node has authorized setting up a working radio link, without said problem, between the wireless device and said candidate node.

According to a second aspect of embodiments herein, the object is achieved by a computer program comprising instructions that when executed by a processing circuit causes the serving network node to perform the method according to the first aspect.

According to a third aspect of embodiments herein, the object is achieved by a data carrier comprising the computer program according to the second aspect.

According to a fourth aspect of embodiments herein, the object is achieved by a method, performed by a wireless device, for managing a problem with a first radio link between the wireless device and a serving network node comprised in a wireless communication network. The wireless device receives first information from the wireless communication network, such as from. a network node thereof, in some embodiments from the serving network node. Said first information comprises a first identifier and informs the wireless device that the first identifier, if received from a candidate network node, means that the serving network node has authorized setting up a working radio link, without said problem, between the wireless device and said candidate node.

According to a fifth aspect of embodiments herein, the object is achieved by a computer program comprising instructions that when executed by a processing circuit causes the wireless device to perform the method according to the fourth aspect.

According to a sixth aspect of embodiments herein, the object is achieved by a data carrier comprising the computer program according to the fifth aspect.

According to a seventh aspect of embodiments herein, the object is achieved by a method, performed by non-serving network node, for managing a problem with a first radio link between a wireless device and a serving network node. The serving network node and the non-serving node are comprised in a wireless communication network. The non-serving network node receives second information from the wireless communication network, such as from. a network node thereof, in some embodiments from the serving network node. The second information comprises a second identifier and informs the non-serving node that the second identifier, in case a problem with the first radio link is detected, may be received in association with a request for participation in setting up a new, working radio link, without said problem, for the wireless device.

According to an eighth aspect of embodiments herein, the object is achieved by a computer program comprising instructions that when executed by a processing circuit causes the non-serving network node to perform the method according to the seventh aspect.

According to a ninth aspect of embodiments herein, the object is achieved by a data carrier comprising the computer program according to the eighth aspect.

According to a tenth aspect of embodiments herein, the object is achieved by a network node for managing a problem with a first radio link between a wireless device and a serving network node comprised in the wireless communication network. In some embodiments said network node is the serving network node. Said network node is configured to send first information to the wireless device. The first information comprises a first identifier and informs the wireless device that the first identifier, if received from a candidate network node, means that the serving network node has authorized setting up a working radio link, without said problem, between the wireless device and said candidate node.

According to an eleventh aspect of embodiments herein, the object is achieved by a wireless device for managing a problem with a first radio link between the wireless device and a serving network node comprised in a wireless communication network. The wireless device is configured to receive first information from the wireless communication network, such as from a network node thereof, in some embodiments from the serving network node. Said first information comprises a first identifier and informs the wireless device that the first identifier, if received from a candidate network node, means that the serving network node has authorized setting up a working radio link, without said problem, between the wireless device and said candidate node.

According to an twelfth aspect of embodiments herein, the object is achieved by a non-serving network node for managing a problem with a first radio link between a wireless device and a serving network node. The serving network node and the non-serving node are comprised in a wireless communication network. The non-serving network node is configured to receive second information from the wireless communication network, such as from a network node thereof, in some embodiments from the serving network node. Said second information comprises a second identifier and informs the non-serving node that the second identifier, in case a problem with the first radio link is detected, may be received in association with a request for participation in setting up a new, working radio link, without said problem, for the wireless device.

Use of the first identifier in such signaling as indicated above enable robust and comprehensive signaling when a working radio link is to be set up in response to the problem with the first radio link. Also, thanks to the first identifier and the associated authorization, from perspective of the wireless device, the working radio link can be set up with similar handling independent on if the working radio link is a repaired version of the first radio link or a new, second radio link between the wireless device and a non-serving network node that replaces the serving network node, i.e. when a non-serving network node will become a new serving network node. The use of the first identifier and the information about the authorization also enable to, in a safe way, continue to use a context of the first radio link, not only in the case then the first radio link is repaired, but also when the new, second radio link has to be set up to replace the first radio link. Thereby it can be avoided relatively slow and time consuming signaling associated with setting up a new radio link, such as in conventional random access, which normally is required when it is needed to set up a new working radio link.

Hence, embodiments herein facilitate accomplishing a working radio link when there is a problem with a radio link, and enable less delay and less signalling overhead cost than performing a conventional random access procedure. In general embodiments herein thus provide one or more improvements with regard to how radio link problems are managed in wireless communication networks.

BRIEF DESCRIPTION OF THE DRAWINGS

Examples of embodiments herein are described in more detail with reference to the appended schematic drawings, which are briefly described in the following.

DETAILED DESCRIPTION

Figure 1:
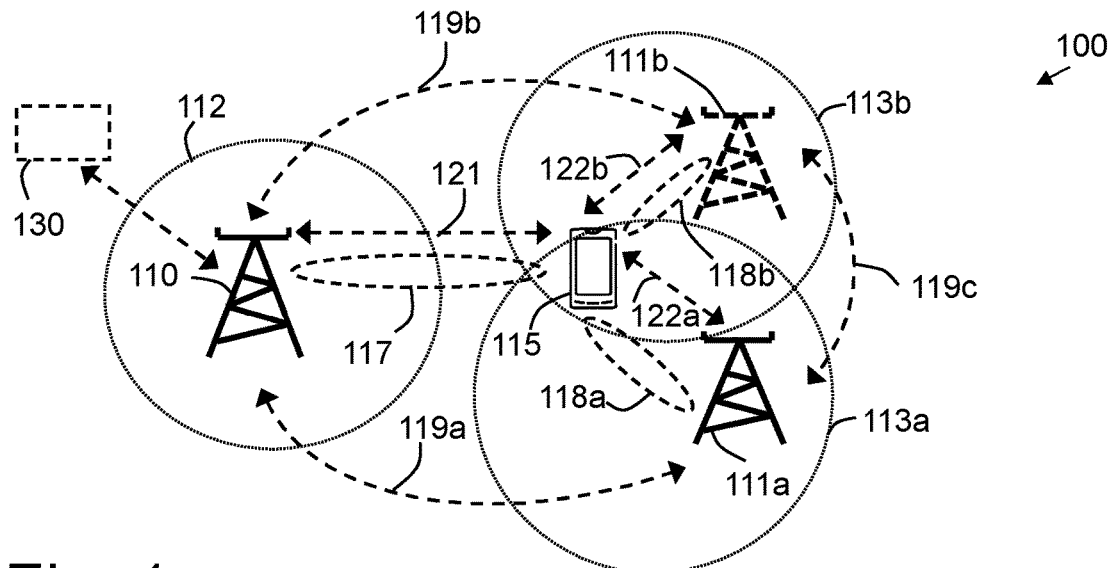
FIG. 1 is a block diagram schematically depicting an example of a wireless communication network in which embodiments herein may be implemented.

FIG. 1 schematically depicts an example of a wireless communication network 100, e.g. a telecommunication network, in which embodiments herein may be implemented. The figure also shows an example of a wireless device 115 for communication in the wireless communication network 100.

The wireless communication network 100 comprises a serving network node 110, a first non-serving network node 111a and a second non-serving network node 111b, which may be radio network nodes such as base stations. The terms "serving" and "non-serving" are in relation to the exemplary wireless device 115 and will be further explained below. The serving network node 110 is typically associated with, e.g.

provides, a first radio coverage in a first radio coverage area 112 indicated by a perimeter thereof in the figure. The first radio coverage area 112a may be a radio coverage of a relatively large area for serving wireless devices located therein and/or may correspond to an area where reference signals transmitted by the serving radio network node are available for reception by wireless devices. Corresponding radio coverage areas, namely a second radio overage area 113a and a third radio coverage area 113b, are also shown in the figure and are correspondingly associated with the first non-serving radio network node 111a and the second non-serving radio network node 111b, respectively.

Further, the serving network node 110 may be associated with, e.g. provide, a first alternative or additional radio coverage area 117, indicated by a perimeter thereof in the figure, that may correspond to radio coverage provided by a so called beam, i.e. a relatively narrow and directional radio coverage, such as accomplished by so called beamforming, for serving one or a few wireless devices, but typically only a single wireless device, e.g. the wireless device 115.

Similarly, the first non-serving network node 111a and the second non-serving network node 111b may be associated with, e.g. provide, corresponding a second alternative or additional radio coverage area 118a and a third alternative or additional radio coverage area 118b, respectively.

As used herein, "radio network node" may as such, and may be used to, refer to any device configured to be part of a wireless communication network and that directly or indirectly is part of providing radio coverage for serving one or more wireless devices in the wireless communication network 100.

As used herein, "radio coverage area" is an area of radio coverage that typically is provided by a radio network node, which radio coverage enable a wireless device to access a wireless communication network that the radio network node is part of, i.e. is comprised in. A radio coverage area, e.g. any one of the radio coverage areas 112, 113a-b, may be associated with one or more of the following:

one or more frequencies, e.g. a frequency range or a frequency band, that may be represented by one, a single frequency, indicating radio frequencies of the radio coverage, transmission of access information, e.g. an access information compilation e.g. in the form of an Access Information Table (AIT), enabling a wireless device to access the wireless communication network, and an access identifier enabling a wireless device to initially identify that the radio coverage may enable access to the wireless communication network 100 and that may identify the transmitted access information, e.g. AIT, for example so that a wireless device can find and access it.

The serving network node 110, the first non-serving network node 111a and the second non-serving network node 111b are typically arranged to communicate with each other separately from communication between network nodes and wireless devices. Communication between network nodes may instead e.g. take part over separate communication interfaces, as illustrated in the figure by network node communication interfaces 119a-c. These typically provide means to communicate robustly and efficiently between network nodes without being dependent on communication for or via wireless devices that the network nodes e.g. are arranged to serve.

Further, the figure also illustrates a first radio link 121 between the serving radio network node 110 and the wireless device 115, a second radio link 122a between the first non-serving network node 111a and the wireless device 115, and a third radio link 122b between the second non-serving network node 111b and the wireless device 115.

As used herein, "radio link between a wireless device and a network node" refers to that the wireless device and/or the network node have been configured so that radio communication of downlink and/or uplink data is enabled, which data is specifically associated with the wireless device, e.g. so called user data. Hence, for a wireless device to be served by a network node, i.e. served with regard to downlink and/or uplink data specifically associated with the wireless device, a radio link must be in place. A radio link in turn is typically associated with, such as based on, a radio coverage, e.g. the first radio link 112 may be associated with the first radio coverage area 112 and/or the first alternative or additional radio coverage area 117.

The wireless communication network 100 may comprise a managing network node 130, e.g. for configuring network nodes of the wireless communication network 100. The managing network node 130 may e.g. be a node comprising and/or managing functionality and/or information that is valid and/or used for, and e.g. shared between, multiple network nodes The managing network node 130 may be controlled by an operator of the wireless communication network 100. The managing network node 130 may be directly or indirectly, e.g. via one or more other nodes, communicatively connected with suitable network nodes, e.g. radio network nodes, such as base stations, comprised in the wireless communication network 100. In the shown example, a dotted arrow, illustrates that the managing network node 130 is communicatively connected with the serving network node 110 and in such case it is typically, although not shown in the figure, also directly or indirectly communicatively connected to other network nodes, e.g. base stations, such as the first and second non-serving network nodes 111a-b.

Attention is drawn to that FIG. 1 is only schematic and for exemplifying purpose and that not everything shown in the figure may be required for all embodiments herein, as should be evident to the skilled person. Also, a wireless communication network or networks that in reality correspond(s) to the wireless communication network 100 will typically comprise several further network nodes, such as base stations, etc., as realized by the skilled person, but which are not shown herein for the sake of simplifying.

As used herein, "radio link problem", or "Radio Link Problem (RLP)", refers to a problem associated with a radio link, which problem negatively affect communication over said radio link. The problem may be in relation to a previous situation when the radio link was working and not associated with, e.g. having, said problem. A non-working, such as failed radio link, e.g. associated with a radio link failure, is an example of a RLP, but a RLP may also exist for a working but in some way deteriorated radio link with regard to communication over the radio link. A radio link failure may in the prior art be named Radio Link Failure (RLF).

As already mentioned, and should be realized by the skilled person, a radio link is typically based on and even dependent on radio coverage. Hence, a typically RLP may occur when there is lack of or, too weak, or some other problem related to radio coverage. For example, if the wireless device 115 has moved outside the first radio coverage area 112 and/or is not reach by the first alternative or additional radio coverage area 117, e.g. beam, this typically results in a RLP.

Detection of a RLP for a radio link between a wireless device and a serving network node, e.g. the first radio link 121 between the wireless device 115 and the serving network node 110, may be different if it is the wireless device 115 that detects the RLP or if it is the serving network node 110 that detects the RLP. Detection of a RLP may correspond to detection of a one or more events that may be named RLP events.

For example, a wireless device, such as the wireless device 115, may detect a RLP, or RLP event, according to one or more of the following:

- An expected DL signal "disappears", e.g. a scheduled or periodic DL-reference signal falls below a threshold. A timer may be configured for how long the signal needs to be below the threshold before the RLP is considered detected.
- A monitored DL signal "appears", e.g. a scheduled or periodic DL-reference signal is above a threshold. A timer may be configured for how long the signal needs to be above the threshold before the RLP is considered detected.
- No response on UL transmission, typically after a scheduling request transmission or a contention based channel transmission. A counter may be applied for how many transmissions need to be un-responded before the RLP is considered detected.

For example, a network node, such as the serving network node 110, may detect a RLP, or RLP even, according to one or more of the following:

- An expected UL signal "disappears", e.g. scheduled or periodic UL-reference signal falls below a threshold. A timer may be configured for how long the signal needs to be below the threshold before the RLP is considered detected.
- A monitored UL signal "appears", e.g. scheduled or periodic UL-reference signal is above a threshold. A timer may be configured for how long the signal needs to be above the threshold before the RLP is considered detected.
- No response on DL transmission, typically a UL grant or DL assignment. A counter may be applied for how many transmissions need to be un-responded before the RLP is considered detected.

It may be noted that the examples of RLPs and how they may be detected, are different for how RLFs conventionally are detected.

Figure 2:
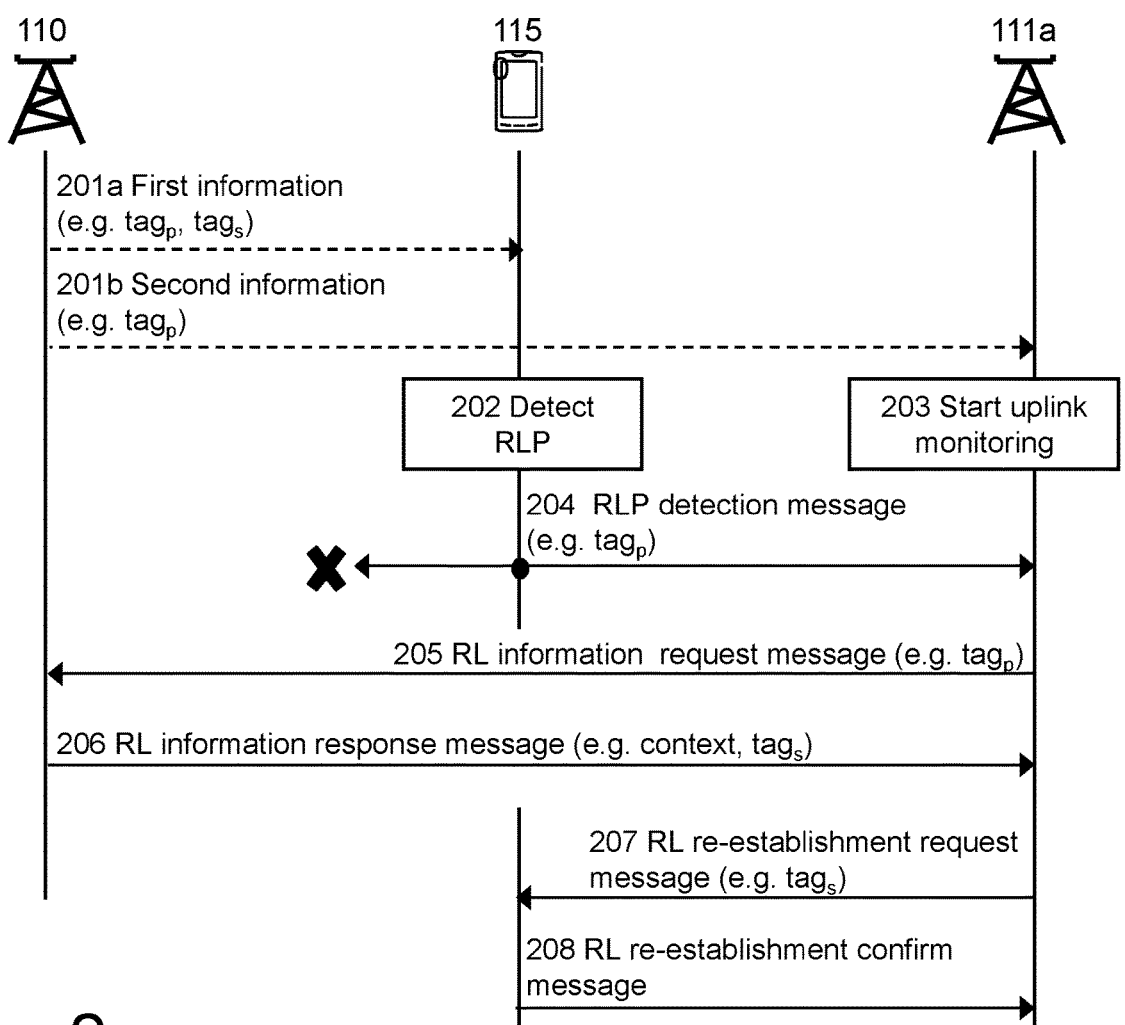
FIG. 2 is a first combined signaling diagram and flowchart for describing embodiments herein where a wireless device detects a Radio Link Problem (RLP) and contacts a non-serving network node in order to resolve the RLP.

FIG. 2 depicts a first combined signaling diagram and flowchart, which will be used to discuss embodiments in a first exemplary scenario where the wireless device 115 detects a RLP for the first radio link 121 and contacts the non-serving network node 111a in order to resolve the RLP.

The actions below may be taken in any suitable order and/or be carried out fully or partly overlapping in time when this is possible and suitable.

Action 201a

The serving network node 110 sends first information to the wireless device 115 that receives the first information. This preferably occurs in connection with that the serving network node 110 becomes serving network node for the wireless device 115 or at some other point when it is known that the first radio link 121 is working. The first information comprises a first identifier and informs, e.g. instructs, the wireless device 115 that the first identifier, if later, e.g. during certain circumstances, is received from a network node, e.g. the first non-serving network nodes 111a, means that the serving network node 110 has authorized setting up a working radio link, i.e. without RLP, between the wireless device 115 and said network node.

This, as will be better understood in view of the description as a whole, enable robust and comprehensive signaling when a working radio link is to be set up in response to the problem with the first radio link 121. Also, thanks to the first identifier and the associated authorization, from perspective of the wireless device 115, the working radio link can be set up with similar handling independent on if the working radio link is a repaired version of the first radio link 121 or a new, second radio link, e.g. the second radio link 122a, between the wireless device 115 and the first non-serving network node 111a. The new working radio link will thus replace the serving network node 110 as new serving network node, which corresponds to a situation when a non-serving network node will become a new serving network node. The use of the first identifier and the information about the authorization also enable to, in a safe way, continue to use a context of the first radio link 121, as is further discussed below, not only in the case then the first radio link 121 is repaired, but also when a new, second radio link, e.g. the second radio link 122a is set up to replace the first radio link 121. Thereby it can be avoided relatively slow and time consuming signaling e.g. such as associated with setting up a new radio link by means of conventional random access, which else may be required when it is needed to set up a new working radio link, at least when the first radio link 121 is not working at all.

In the figure, the first identifier is exemplified as a tag named tag_s, to indicate that the first identifier may be a simple and relatively small sized identifier. The first identifier is typically an identifier that identifies the serving network node 110, e.g. uniquely, in the wireless communication network 100, or in a local neighborhood including at least network nodes, e.g. base stations, associated with neighboring radio coverage, such as the first and second non-serving network nodes 111a-b in the shown example. In other words, the second identifier may be unique in a certain first local area comprising the serving network node 110, which first local area may comprise the first radio coverage area 112 and the second and third radio coverage areas 113a-b. Said certain first local area may be predetermined and/or predefined.

As should be realized, informing by the first information may be accomplished implicitly. For example, it may it be known, e.g. predetermined, that when the wireless device 115 receives a type of identifier as the first identifier, e.g. tag_s, from a serving network node, e.g. as part of a configuration message or similar, this has a special meaning. For example, if the first identifier later, e.g. during certain circumstances, such as part of a particular message, is received from a network node, e.g. the first non-serving network node 111a, the wireless device 115 knows that this means that the serving network node 110 has authorized setting up a working radio link between the wireless device 115 and the first non-serving network node 111a.

In some embodiments, the first information may further, e.g. in a same or similar manner as described above, also inform, or instruct, the wireless device 115 that the first identifier, if later received from a network node, e.g. from the serving network node 110 or any one of the non-serving network nodes 111a-b, means that a context of the first radio link 121 is still valid and thus can be continued to be used for said working radio link. Context is further discussed and exemplified separately below. This makes it possible to, also in case a new radio link is set up to accomplish a working radio link, re-use context from the first radio link 121 and thereby save time and faster accomplish a working radio link than else would be the case.

Moreover, in some embodiments, the first information further comprises another, second, identifier and may further, e.g. in a same or similar manner as described above, inform, e.g. instruct, the wireless device 115 to, in response to that a problem with the first radio link 121 has been detected, send a message comprising the second identifier for receipt by one or more candidate network nodes, e.g. any radio network node or base station that is located close enough to be reached by the wireless device 115, e.g. including the serving network node 110 and one or more of non-serving network nodes, such as the first and second non-serving network nodes 111*a-b*. Said one or more candidate network nodes are such that are candidates for being involved in said working radio link, which may be a repaired version of the first radio link 121 or a replacement radio link thereof, e.g. any one of the second or third radio links 122*a-b*. Said message is thus related to participation in setting up a working radio link without said problem for the wireless device 115. See Action 204 below regarding further information relating to this and an example of the message.

In the figure, the second identifier is exemplified as a tag named tag_p, to indicate that also the second identifier may be a simple and relatively small sized identifier. The second identifier is typically an identifier that is usable for uniquely identifying the wireless device 115, implicitly or explicitly, in the wireless communication network 100 or at least in a vicinity of the serving network node 110, e.g. in a neighborhood that includes the serving network node 110 and neighboring non-serving network nodes, such as the first and second non-serving network nodes 122*a-b*. That is, in relation to FIG. 1, the second identifier may be unique in a certain second local area that e.g. comprises the first radio coverage area 112 and the second and third radio coverage areas 113*a-b*. Said certain second local area may be predetermined and/or predefined. Said certain second local area, may but need not, be the same area as the certain first local area.

Note that in some embodiments, the first information need not contain the second identifier, e.g. if the wireless device 115 is already aware of it, e.g. has been provided with earlier. In this case the wireless device 115 may be pre-configured with both the second identifier and how it shall use it, i.e., as deceived above, to, in response to that a problem with the first radio link 121 has been detected, send said message comprising the second identifier for receipt by said one or more candidate network nodes.

Hence, as should be realized, the present action may be implemented by sending more or less only one or two identifiers, e.g. comprised in a simple message, from the serving network node 110 to the wireless device 115.

Action 201*b*

The serving network node 110 may further send second information to one or more non-serving network nodes, including e.g. the first and second none-serving network nodes 111*a-b*, comprised in the wireless communication network 100. In the following it is assumed that at least the first non-serving network node 111*a* receives the second information. The second information may be sent to all of potential non-serving network nodes that may be new serving network nodes for the wireless device 115, e.g. such that are neighboring the serving network node 110 and/or in a certain vicinity of the wireless device 115, and/or in a certain vicinity of a known or likely position of the wireless device 115.

The second information comprises the second identifier and informs said one or more non-serving nodes, i.e. the intended recipients of the second information, that the second identifier, in case a problem with the first radio link 121 is detected, may be received in association with a request for participation in setting up a new, working radio link, e.g. any one of the second and third radio links 122*a-b*, without said problem for the wireless device 115. This way the non-serving network nodes that receives the request become able to monitor for and/or trigger when/if receiving the second identifier, i.e. knows what to check for and thereby can apply suitable handling in response to reception. See Actions 204-207 below for an example.

Note that the second information, similarly as the first information, may implicitly inform said one or more non-serving node.

Hence, as should be realized, also Action 201*b* may be implemented by sending more or less only one identifier, e.g. comprised in a simple message, from the serving network node 110 to said wireless device 115.

The present action preferably occurs in connection with that the serving network node 110 becomes serving network node for the wireless device 115 since it may not be known at what point thereafter a RLP may occur. The second information is typically sent via a network node communication interface, to the first non-serving network node 111*a*, e.g. over the first network node communication interface 119*a*.

From the above it may be noted that the information associated with the second identifier is different in Action 201*a* and Action 201*b*, i.e. depending on if the second identifier is sent from the serving network node 110 to the wireless device 115 or to said one or more non-serving network nodes. This can simply be accomplished by that the wireless device 115 and non-serving network nodes are configured to respond differently to the second identifier and/or depending on type of node that sends the second identifier, and/or type of message that it is comprised in.

Actions 201*a* and/or 201*b* may be considered as, or be part of, that the wireless communication network 100, e.g. through the serving network node 110, configures a RLP procedure in the wireless device 115, and in the first and second non-serving network nodes 111*a-b*.

Action 202

At some point in time the wireless device 115 may detect a RLP, e.g. in the form of a RLP event. The RLP and RLP event may be in accordance with the above discussion regarding RLPs. The wireless device 115 may be configured to always, regularly, e.g. periodically, and/or during certain circumstances detect RLPs when/if such occur and are detectable by the wireless device 115.

Action 203

The first non-serving network node 111*a* may start performing uplink monitoring, i.e. monitor in the uplink for the second identifier, in accordance with the second information received in Action 201*b*. The monitoring may e.g. be continuous or periodic and may e.g. be performed on a specific channel, such as one that is assigned and/or is used for transmitting identifiers like the second identifier. Such channel may be named an uplink RLP assistance channel or similar. The uplink monitoring may start in response to receipt of the second information in Action 201*b* and/or after a certain time of inactivity. An inactivity timer may be used. The first non-serving network node 111*a* may perform uplink monitoring in general for certain type of identifiers including the second identifier.

Action 204

The wireless device 115 may send a radio link problem detection message comprising the second identifier to one or more non-serving network nodes comprised in the wireless communication network 100. It is in the present example assumed that the first non-serving network node 111*a* is one such node and that it receives the radio link problem detection message, e.g. owing to the monitoring in Action 203. The radio link problem detection message is sent in response to that the wireless device 115 in Action 202 detected the RLP. The radio link problem detection message is requesting said one or more non-serving network nodes, i.e. including the first non-serving network node 111a, to participate in setting up a new, working radio link, e.g. the second radio link 122a, without said problem for the wireless device 115.

As realized, non-serving network nodes receiving the radio link problem detection message include such non-serving network nodes, e.g. the first non-serving network node 111a, that have received the second information in Action 201b, and thereby may be aware of and, as the first non-serving network node in Action 203, be monitoring for the second identifier.

The wireless device 115 may be pre-configured, by default and/or by configuration e.g. received in connection with Action 201b or similar, to perform according to the present action upon detection of a RLP. The radio link problem detection message may e.g. be sent out, e.g. broadcasted, so that it can be received by any network node, non-serving and/or serving, that are close enough to be able to receive it.

In the scenario exemplified by FIG. 2 it assumed that the serving network node 110 does not, e.g. by not being able to, receive the radio link problem detection message or another message that may be requesting repairing the first radio link 121. This unability is indicted in the figure by the black cross. It should be understood to be a rather common situation that the serving network node 110 cannot be reached by the wireless device 115 when there is a problem with the first radio link 115.

As indicated above, the second identifier, e.g. the tag_p, is such that can be used by a receiving non-serving network node, here the first non-serving network node 111a, to identify the wireless device 115, either explicitly or implicitly.

Action 205

The first non-serving network node 111a may send, to the serving network node 110 that receives, a radio link information request message. The first non-serving network node 111a may send this message in response to the received radio link problem detection message in Action 204. The radio link information request message requests information about a context of the first radio link 121, which context can continue to be used for said new, working radio link, such as the second radio link 122a between the first non-serving radio network node 111a and the wireless device 115.

In other words, after a non-serving node, such as the first non-serving network node 111a, has received the radio link problem detection message with the second identifier in Action 204, and thereby the wireless device 115 is identified and thus known to the non-serving network node, it can contact the serving node 110 in order to receive information related to the problematic radio link.

The first non-serving network node 111a may already know which is the serving network node of the wireless device 115 given the second identifier that identifies the wireless device 115 since it previously, in Action 201b, may have received the second identifier from the serving network node 110. However, if the first non-serving network node 111a does not directly know which is the serving network node given the second identifier, it may ask neighboring network nodes, including e.g. the second non-serving network node 111b and/or the serving network node 110 if they recognize the wireless device 115 associated with the second identifier. The serving network node 110 itself or e.g. the second non-serving network node 111b may respond to such question and thereby the first non-serving network node 111a may become able to find, and send the radio link information request message to, the serving network node 110. Alternatively or additionally the first non-serving network node 111a may use the second identifier to retrieve information about the serving network node from a management node (not shown) and/or central server (not sown), e.g. by getting information about a serving node identity related to the second identifier. When/if a management node and/or central server or the like is used to handle identifiers and associated information, also the serving network node 110 may use the management node and/or central server for such purpose. This may e.g. occur in connection with when the serving network node 110 became serving network node for the wireless device 115 and/or e.g. in connection with configuration of the wireless device 115, such as in Action 201a. The management node may, but need not, correspond to the managing network node 130.

Action 206

The serving network node 110 may send to the first non-serving network node 111a, that receives, a radio link information response message comprising said first identifier and information about said context. The radio link information response message may be sent and received in response to the sent radio link information request message in action 205. The second identifier may be received from the serving network node 110 together with the context so that the first non-serving network node 111a will have "proof" that the received information about context is authorized by the serving network node and thereby can use (see next action) the second identifier to prove this for the wireless device 115.

The radio link information response message may e.g. comprise some or more of the following: a current context for the wireless device 115, a state of some or all protocol layers, non-transmitted DL data (if any) destined for the wireless device 115, UL data (if any) received from the wireless device 115 by the serving network node 110 and waiting in re-ordering buffers in the serving network node 110, one or more soft bits in a Hybrid Automatic Repeat Request (HARQ) buffer, just to give some examples of what information about the context may comprise and/or be associated with.

Action 207

The first non-serving network node 111a may send a radio link re-establishment request message to the wireless device 115 that receives it. The radio link re-establishment message may comprise the first identifier. Hence, the wireless device 115, may know, thanks to the first identifier, that the serving network node 110 has authorized re-establishment of new radio link, e.g. the second radio link 122a, with the first non-serving network node 111a to replace the problematic first radio link 121 with the serving network node 110. By the radio link re-establishment request message and/or the first identifier comprised therein, the wireless device 115 may additionally be informed that a context it had with the serving network node 110 is now available for and may or will be reused for the new radio link with the first non-serving network node 111a.

In some embodiments, the first identifier may be associated with, e.g. relate, to a control channel configuration of the wireless device 115. The wireless device 115 may thereby, through detection of a scheduling assignment and/or grant on a control channel be informed that the serving network node 110 has authorized the transmission and in such case no explicit reconfiguration message may be needed and the first identifier may not need to be comprised in the radio link re-establishment request message.

Action 208

The wireless device 115 may send a radio link re-establishment confirm message to the first non-serving network node 111a. This may be in response to receipt of the radio link re-establishment request message in the previous action and that the wireless device 115 has accepted setting up a new radio link with the first non-serving network node 111a.

Actions 207-208 may be considered part of initial actions of a new radio set-up procedure between the wireless device 115 and the first non-serving network node 111a. This procedure typically, as should be realized, also comprise further actions, and eventually results in that the new, working radio link, in the shown example the second radio link 122a, without said problem has been set-up for the wireless device 115.

Figure 3:
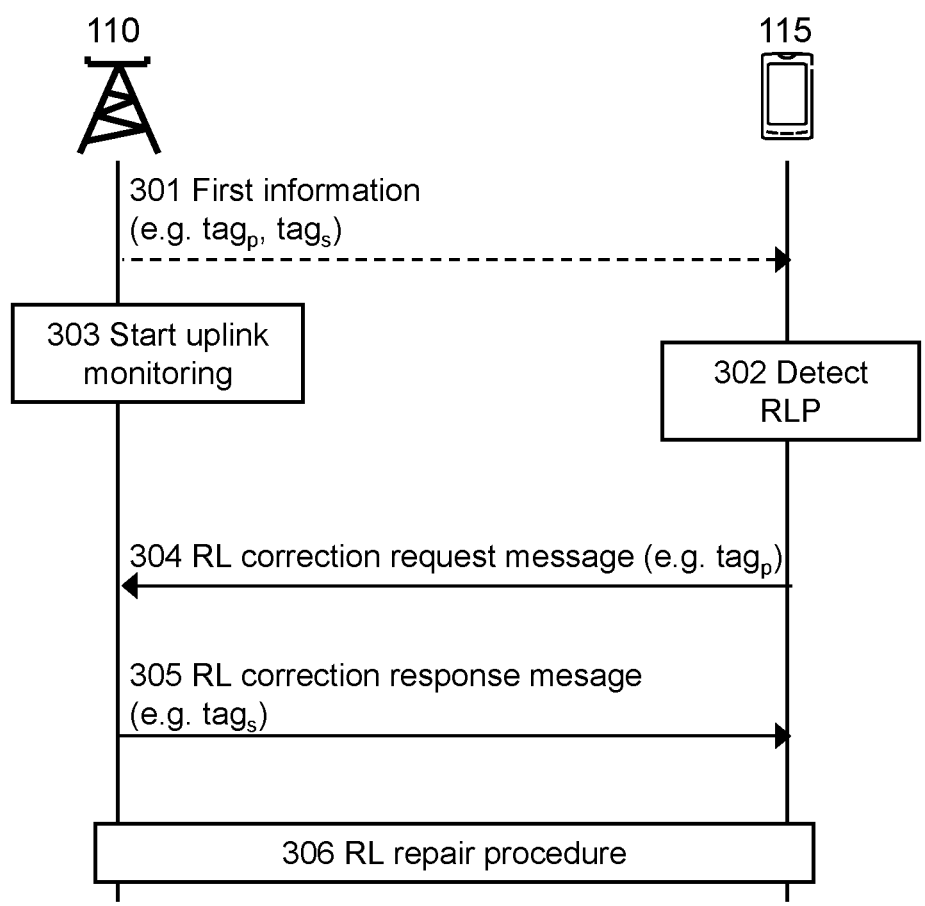
FIG. 3 is a second combined signaling diagram and flowchart for describing embodiments herein where a wireless device detects a RLP and contacts a serving network node in order to resolve the RLP.

FIG. 3 depicts a second combined signaling diagram and flowchart which will be used to discuss embodiments in a second exemplary scenario where the wireless device 115 detects a RLP for the first radio link 121 and contacts the serving network node 111a in order to resolve the RLP.

The actions below may be taken in any suitable order and/or be carried out fully or partly overlapping in time when this is possible and suitable.

Action 301

This action corresponds to Action 201a described above and will therefore not be further described here.

Action 302

This action corresponds to Action 202 described above and will therefore not be further described here.

Action 303

This action may correspond to Action 203 described above, but is here performed by the serving network node 110 instead of the first non-serving network node 111a. The monitoring may thus be in accordance with second information sent in Action 201b, but which information, in particular the second identifier, is already known by the serving network node. The uplink monitoring may start directly in connection with that the serving network node 110 started to serve the wireless device 110, i.e. become serving network node 110, and/or when the first radio link 121 was initially established and/or after an inactivity timer has expired.

However, although not needed, the monitoring as such may look different depending on if a network node is monitoring for a radio link problem detected by a wireless device that it serves, i.e. is a serving network node for as in the present example, or a radio link problem that is detected by a wireless device that the network node is not serving, i.e. is a non-serving network node for, i.e. as in the previous FIG. 2 example.

When the present action is the same as Action 203 there is an advantage of less different signalling needed and less complex implementation. Alternatively the present action and Action 203 may differ to some extent, e.g. that the monitoring is for another message and/or for the second identifier but on another channel than in Action 203. This may have other advantages, e.g. that more efficient monitoring may be enabled, e.g. since the special relationship between a serving network node a served wireless device may be utilized.

Action 304

The wireless device 115 may send, in response to the detection in Action 302, a radio link correction request message to the serving network node 110 that receives it, e.g. owing to the monitoring in Action 303. The radio link correction request message, which may comprise the second identifier, requests the serving network node 110 to participate in repairing the first radio link 121 in order to make it a working radio link without said problem.

In some embodiments the radio link correction request message corresponds to and may be the same as the radio link problem detection message discussed above under Action 204.

As indicated above, the second identifier, e.g. the tag_p, if comprised in the radio link correction request message in the present action, may be identifying the wireless device 115, either explicitly or implicitly. Although identification as such may not be needed by the serving network node 100, it may still be advantageous, in particular when the radio link correction request message and the radio link problem detection message is one and the same message, since it is then enabled less signaling and a network can be informed in the same way when there is a RLP, independent on if the network node is serving or non-serving. Different handling to accomplish a working radio link, e.g. by repairing an existing radio link or setting up a new radio link, is still enabled since a serving network node, when receiving the second identifier, easily can find out if itself is a serving network node or not for the wireless device being identified by the received second identifier. Also, when the second identifier identifying the wireless device 115 is sent in the present action, this helps the serving network node 110 to find out which wireless device is having RLP in case several wireless devices are being served at the same time.

Action 305

The serving network node 110 may send and the wireless device 115 receives, in response to the sent radio link correction request message in Action 304, a radio link correction response message. The radio link correction response message may comprise the first identifier. Hence, also in this case, the wireless device, in accordance with the first information received in Action 301, and thanks to the first identifier, may be informed that the reply is actually from the serving network node 110 and that the serving network node 110 has authorized repairing of the first radio link 121. Also, when the first identifier is present and identifies the serving network node 110, this enable the wireless device 115 to distinguish a radio link correction response message received from the serving network node 110 from such message received from a non-serving network node, such as in embodiments where also non-serving network nodes are enabled to reply with a radio link correction response message as well.

Action 306

When, through Actions 304-305, both the serving network node 110 and the wireless device 115 are aware of the RLP and agreed to correct the RLP by repairing the first radio link 121, necessary actions are performed according to a radio link repair procedure. This procedure, as should be realized, eventually results in that first radio link 121 has been repaired and been made a working radio link again, without said problem. The radio link repair procedure of the present action may correspond to performing a optimization procedure for the first radio link, which may be such procedure used when the radio link 121 was set up in a first place. However, for repair and/or when possible to utilize and/or keep context, the procedure may be faster than before.

Actions 304-305 and/or the radio link repair procedure may be performed directly, or alternatively the RLP can be allowed to remain for the first radio link 121, i.e. with a problematic radio link, until it needs to be fixed for the purpose of transmitting user data. In that case, any next transmission of user data to/from the wireless device 115 may the start the radio link repair procedure. When the radio link repair procedure starts, a robust antenna configuration may be used on both sides, which through the optimization procedure can be changed so that a more conventional antenna configuration for transmission of user data is used at the end of the radio link repair procedure, i.e. when the first radio link 121 has been repaired.

Figure 4:
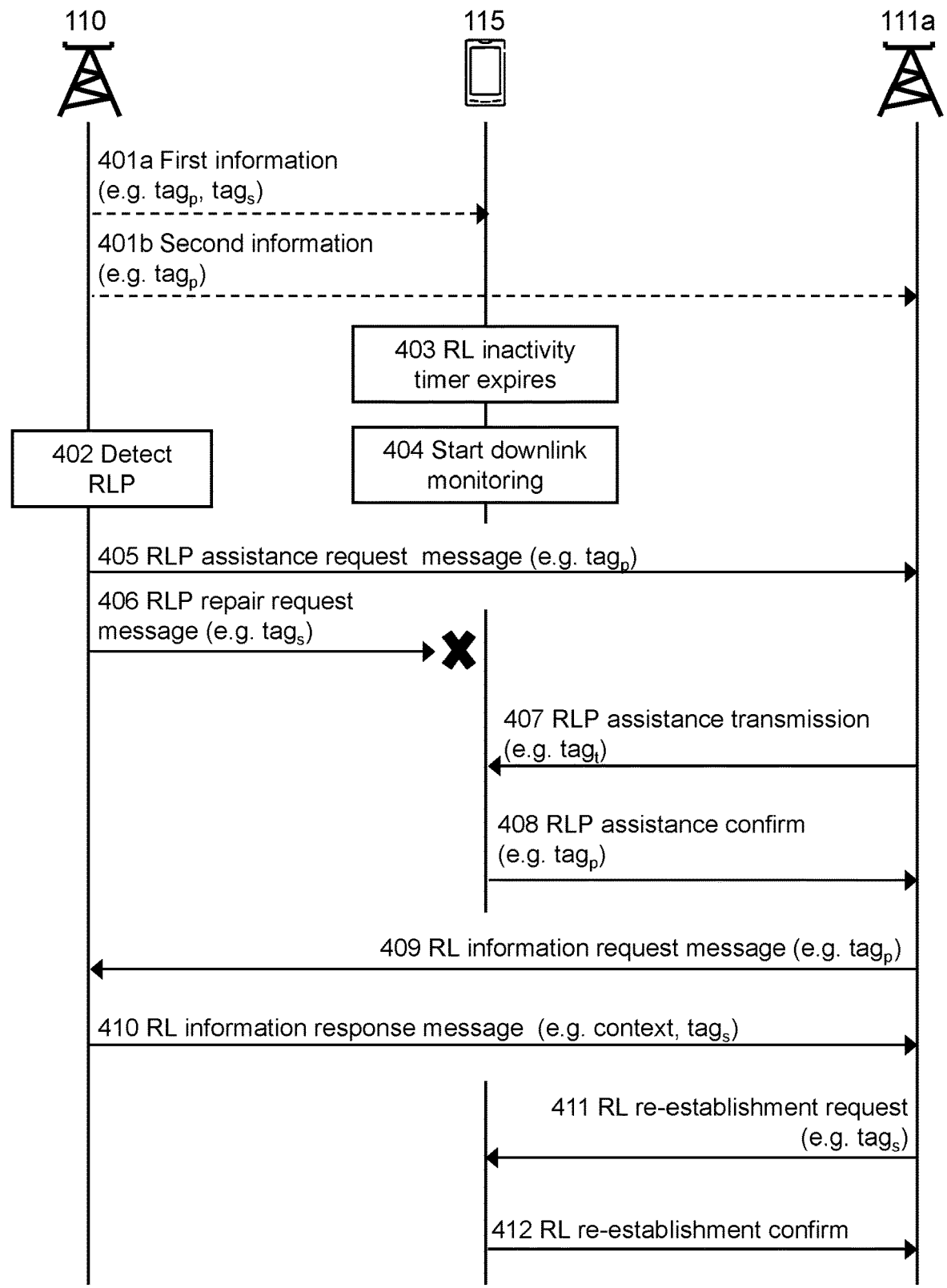
FIG. 4 is a third combined signaling diagram and flowchart for describing embodiments herein where a serving network node detects a RLP for a wireless device and contacts a non-serving network node in order to resolve the RLP.

FIG. 4 depicts a third combined signaling diagram and flowchart which will be used to discuss embodiments in a third exemplary scenario where the serving network node 110 detects a RLP for the first radio link 121 and contacts the first non-serving network node 111*a* in order to resolve the RLP.

The actions below may be taken in any suitable order and/or be carried out fully or partly overlapping in time when this is possible and suitable.

Action 401*a*

This action corresponds to Action 201*a* described above and will therefore not be further described here.

Action 401*b*

This action corresponds to Action 201*b* described above and will therefore not be further described here.

Action 402

At some point in time the serving network node 110 may detect a RLP, e.g. in the form of a RLP event. The RLP and RLP event may be in accordance with the above discussion regarding RLPs. The serving network node 110 may be configured to always, regularly, e.g. periodically, and/or during certain circumstances detect RLPs when/if such occur and are detectable by the serving network node 110.

Action 403

A RL inactivity timer may be used to measure a time period of DL inactivity of the first radio link 115. As used herein, inactivity of a radio link means that there is no activity detected over the radio link, including no transmission of user data. In some embodiments the timer may be set to zero seconds.

Action 404

The wireless device 115 may start to perform downlink monitoring, i.e. monitor in the downlink for a certain message and/or identifier that indicates a RLP has been identified. The downlink monitoring may start in response to Action 403, i.e. after a certain time of inactivity. The RLP detection is typically implied to have been made by the serving network node 110 when it is not the wireless device 115 that has made the detection. The monitoring may e.g. be continuous or periodic and may e.g. be performed on a specific channel, such as one that is assigned and/or is used for informing about detected RLPs. Such channel may be named an downlink RLP assistance channel or similar. The wireless device 115 may perform downlink monitoring in general for certain type of messages and/or identifiers.

Action 405

The serving network node 110 may send, in response to the detection of Action 404, a radio link problem assistance request message to one or more non-serving network nodes, including the first non-serving network node 111*a*. The radio link problem assistance request message may comprise the second identifier and request participation in setting up said new, working radio link without said problem for the wireless device 115. It is in the present example assumed that the first non-serving network node 111*a* is a network node that receives the radio link problem detection message. However, the radio link problem assistance request message may be sent to all of non-serving network nodes that potentially may be new serving network nodes for the wireless device 115, e.g. such that are neighboring the serving network node 110 and/or in a certain vicinity of the wireless device 115, and/or in a certain vicinity of a known or likely position of the wireless device 115. The radio link problem assistance request message may be sent to same non-serving network nodes as the second information in Action 401*b*.

The radio link problem assistance request message is advantageously sent over a robust interface for communication between network nodes, as discussed previously, e.g. e.g. over the network node communication interface 119*a*.

Action 406

The serving network node 110 may also send, in response to the detection in Action 402, a RLP repair request message to the wireless device 115, which RLP repair request message may comprise the first identifier. This may be done at substantially the same time when sending the radio link problem assistance request message in Action 405, although the repair request message is sent over another interface, wirelessly to the wireless device. Another option is to first send the message of the present action to see if the first radio link 121 first can be repaired and if not, the problem assistance request message in Action 405 is sent. This however introduces delay and it may therefore be beneficial to instead send the messages at the same time since a decision whether to repair or setting up a new radio link still can be taken later. In any case, for the present scenario of FIG. 4, it is assumed that if the RLP repair request message is sent to the wireless device 115, it still does not reach the wireless device 115, as indicated by the bold black cross in the figure. Since there is a problem with the first radio link 115, it is not unlikely that this happens. For further description of the RLP repair request message and information about a scenario when it reaches the wireless device 115, see below, in particular Action 505, and FIG. 5.

Action 407

A non-serving network node, e.g. the first non-serving network node 111*a*, that receives the radio link problem assistance request message in Action 405 may through the second identifier identify the wireless device 115 and can thereby at least attempt to contact the wireless device to see if it possibly can establish a new radio link to it. For example, a RLP assistance transmission, e.g. comprising a certain message and/or a third identifier, may be sent to the wireless device 115 in response to the received radio link problem assistance request message. It may be sent without that the sending non-serving node knows if the wireless device 115 is there and can receive it. The only way the sending non-serving network node may know that the wireless device has received the transmission of the present action, may be if it the sending non-serving network node receives a confirmation—see e.g. Action 408 below.

In the figure, the third identifier is exemplified as a tag named tag_t, to indicate that also the third identifier may be a simple and relatively small sized identifier and may be different from the first and second identifiers. The third identifier may be an identifier identifying the particular transmission of the present action and/or a message thereof. In some embodiments, the third identifier may identity the non-serving network node sending it, in other embodiment the third identifier may be the second identifier, e.g. tag_t may be tag_p, identifying the wireless device 115. In the latter case the wireless device 115 may, by the receipt, be implicitly informed that e.g. the first non-serving network node 111*a* must have been in contact with the serving network node 110, e.g. if the only way the first non-serving network node 111a could know about the second identifier would be if it previously had received the first information (see Action 401b) from the serving network node 110.

If the RLP repair request message in e.g. Action 406 and the RLP assistance transmission in the present action is the same type of signaling, e.g. based on the same type or sort of message, the wireless device 115 may, if different identifiers are used, utilize this to be able to find out which is coming from the serving network node 110 and which is coming from the first non-serving network node 111a.

Action 408

If and when a wireless device has received a RLP assistance transmission, e.g. when the wireless device 115, as will be assumed in the following, has received the RLP assistance transmission in Action 407, it may in response send a RLP assistance confirmation, e.g. in the form of a message. That is, the wireless device 115 may in the present action send a RLP assistance confirmation to the first non-serving network node 111a. When a non-serving network node receives the RLP assistance confirmation from a wireless device, this may be seen as an acknowledge that the non-serving network node may be able to establish a new, working, radio link to this wireless device 115.

The RLP assistance confirmation may comprise the second identifier, whereby the non-serving network node receiving it, may get informed about the identity of the wireless device that sent the confirmation. In other words, when the first non-serving network node 111a receives the RLP assistance confirmation, it may from the second identifier be informed that it is the wireless device 115 that have sent the confirmation and thus that that the first non-serving network node 111a may be able to establish a new, working, radio link to the wireless device 115.

Action 409

The first non-serving network node 111a may send, to the serving network node 110 that receives, a radio link information request message. The first non-serving network node 111a may send this message in response to the received RLP assistance confirmation in Action 408. The rest of this action correspond to Action 205 described above and will therefore not be further described here.

Actions 410-412

These actions correspond to Actions 206-208 described above and will therefore not be further described here.

Figure 5:
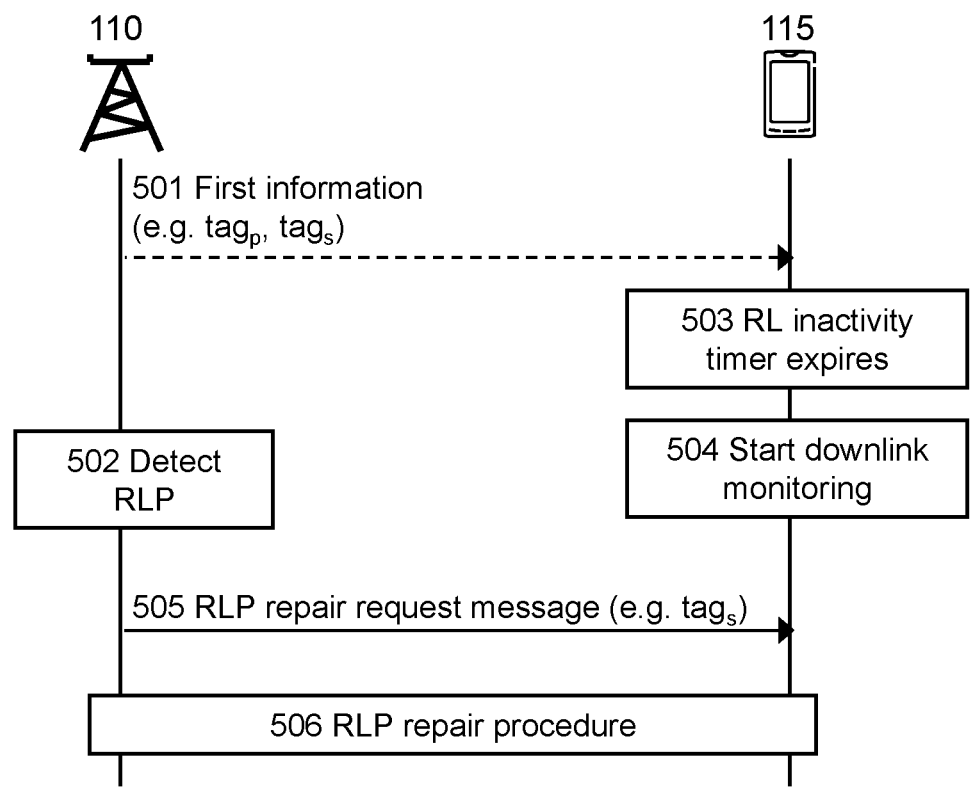
FIG. 5 is a fourth combined signaling diagram and flowchart for describing embodiments herein where a serving network node detects a RLP for a wireless device and contacts the wireless device in order to resolve the RLP.

FIG. 5 depicts a fourth combined signaling diagram and flowchart which will be used to discuss embodiments in a fourth exemplary scenario where the serving network node 110 detects a RLP for the first radio link 121 and contacts the wireless device 115 in order to resolve the RLP.

The actions below may be taken in any suitable order and/or be carried out fully or partly overlapping in time when this is possible and suitable.

Action 501

This action corresponds to Action 201a described above and will therefore not be further described here.

Action 502

This action corresponds to Action 402 described above and will therefore not be further described here.

Actions 503-504

These actions correspond to Actions 403-404 described above and will therefore not be further described here.

Action 505

This action corresponds to Action 406 described above, but in the present exemplary scenario it is assumed that the RLP repair request message is able to reach the wireless device 115. Hence, in the present action the serving network node 110 may send, in response to the detection of the RLP in Action 502, a RLP repair request message to the wireless device 115. The RLP repair request message may comprise the first identifier and requests the wireless device 115 to participate in repairing the first radio link 121 in order to make it a working radio link without said problem.

Action 506

The present action may start with that the wireless device 115 responds to the RLP repair request message with a RLP repair response message or similar, whereby the serving network node 110 is able to know that the wireless device 115 has been informed about the detected RLP, and that the serving network node 110 and the wireless device 115 can communicate with each other in the uplink and downlink, which may be necessary for the present action to be fully carried out, i.e. in order to be able to perform actions according to a radio link repair procedure. This procedure, as should be realized, eventually results in that first radio link 121 has been repaired and been made a working radio link again, without said problem. The rest of the present action may, mutatis mutandis, be performed as described above under Action 306 and will therefore not be described in any further detail here.

Note that some actions above in alternatively may be carried out by other network nodes than indicated. For example, Actions 201a and/or 201b regarding configuration need not be performed by the serving network node 110 but may be performed by in principle any network node, e.g. a management node (not shown) via a current or previously serving network node, e.g. as part of also other configuration actions.

In the above, signaling to/from the wireless device 115 when it is known that a RLP has been detected but not yet been resolved, may be carried out using radio signaling specifically adapted for reaching the wireless device 115 and/or the involved network node, typically the serving network node 110, despite the detected problem with the first radio link 121. Such specific signaling may e.g. concern messages and/or transmissions in one or more of the following actions mentioned above: 304-306 and 505-506.

The specific signaling may e.g. be achieved by more robust type of signaling and/or using another antenna and/or using a wider beam and/or more robust beam and/or other more robust configuration. A more robust beam is in relation to a conventional narrow beam that may be used when a radio link is working, and typically means lower data rate, lower antenna gain, and/or wider beam-width. In any case, the specific signaling increases the chance for information to reach an intended recipient, so that e.g. thereafter appropriate measures can be taken to accomplish a working radio link. The specifically adapted signaling may be selected and/or configured such that if what is being sent when the specific signaling is used reach the intended recipient, this means there is a reasonable chance of being able to repair, such as correct, the first radio link 121 or to set-up a new, working radio link.

Further, as realized from the above, FIGS. 3 and 5, are scenarios where the serving network node 110 and wireless deice 115 repair the first radio link 115. To accomplish this in case of RLP with the first radio link 115, there may be a fall-back procedure regarding communication between the serving network node 110 and the wireless device 115 in case a RLP is detected and until it has been resolved. The fall-back procedure may be based on more robust communication, e.g. such specific signalling as discussed above. For example, the first radio link 15 may normally, when it is working and not associated with a RLP, operate using and/or be associated with a more narrow beam, e.g. corresponding to said first alternative or additional radio coverage area 117. In contrast, when there is RLP and thus the fallback procedure may take over, communication between the serving network node 110 and the wireless device may instead be accomplished using a wider beam, e.g. corresponding to the first radio coverage area 112. Another example: In case a normal, e.g. high bit-rate, data traffic occurs using a high antenna gain and narrow beam, there may be a pre-configured fall-back procedure defined that uses another more robust beam, typically lower data rate, lower antenna gain and with wider beam-width.

One or more of the identifiers and tags mentioned above, i.e. that are associated with the wireless device 115 or any one of the network nodes 110, 111a-b, such as the first identifier and the second identifier, may be based on, or correspond to, any of the following, just to give some specific and further examples:

a synchronization signal that e.g. is associated with the wireless device 115 or any one of the network nodes 110, 11a-b, a Cell Radio Network Temporary Identifier (CRNTI), a sub-part of a CRNTI, an extension of a CRNTI;

a globally unique identifier, a new type of identifier e.g. signalled as a bit-field in a message, a hash-code e.g. of a user identity, a hash-code e.g. of to current context of the wireless device 115 regarding the serving network node 110.

As already indicated, the identifiers should preferably be locally unique for at least network nodes surrounding the wireless device 115 and/or the serving network node 110, e.g. within a certain local area that may be predetermined and/or predefined.

Further, the identifiers, in particular the first identifier used for authorization as described above, may be encrypted and/or secret, while e.g. the second identifier identifying the wireless device may be open and/or public.

Embodiments described herein may be of particular interest in such wireless communication networks as mentioned in the Background, such as discussed for 5G wireless communication networks. However, embodiments herein may of course also be applicable also in further development of more conventional communication networks and systems, such as UMTS and LTE.

As already indicated in the foregoing, compared to conventional methods embodiments herein enable a higher degree of radio link robustness and a faster recover mechanism regarding RLPs. RLPs and e.g. related problems, such as "loosing" a wireless device being served, e.g. in a narrow beam, may be faster and more efficiently handled and solved thanks to embodiment herein. Further, embodiments herein facilitate use of more aggressive beam-forming than else would be the case since RLPs are enabled to be better taken care of. More aggressive beam-forming may e.g. involve using more narrow beams, resulting in less interference, higher efficiency, less energy consumption etc.

Figure 6:
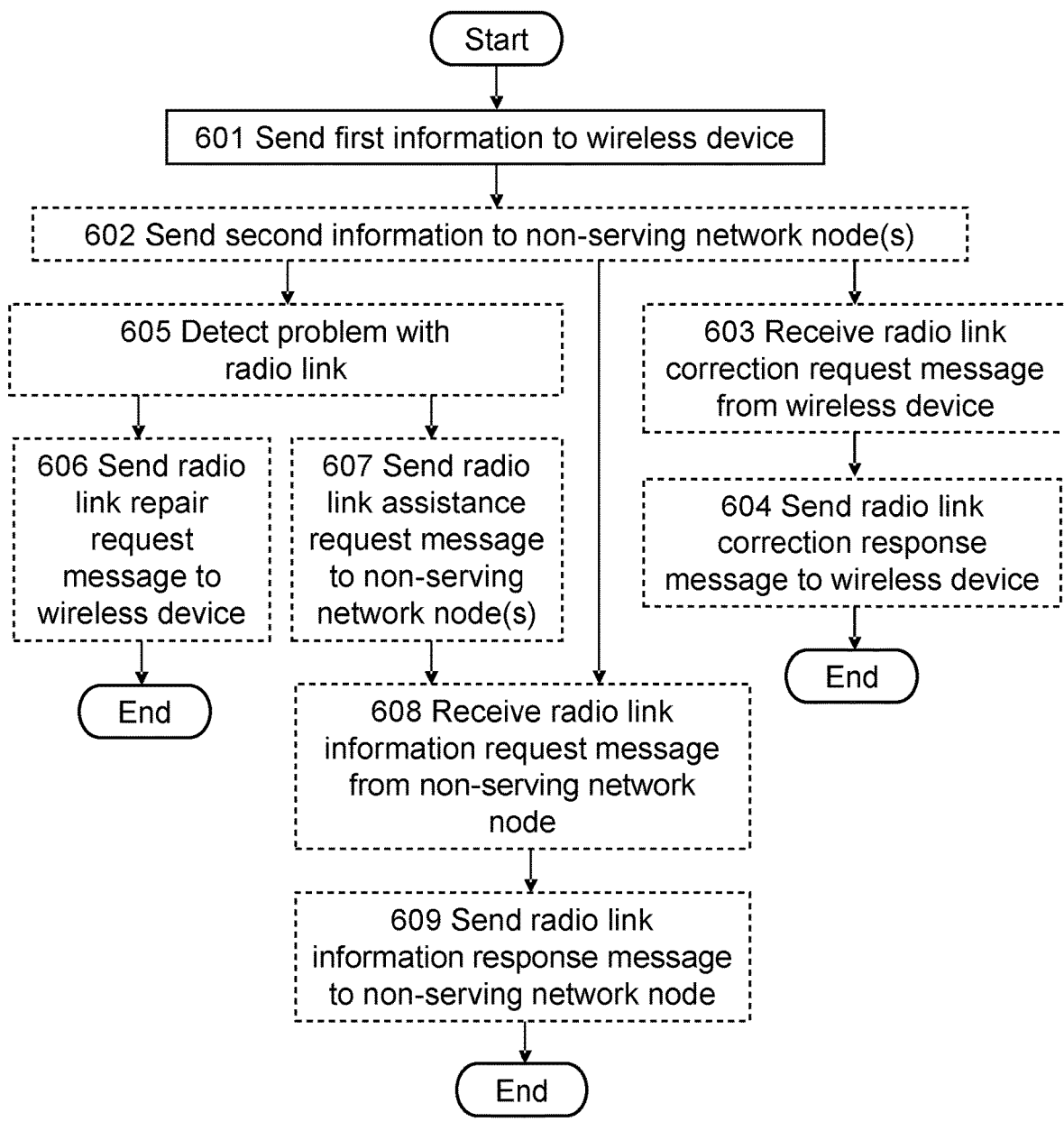
FIG. 6 is a flowchart schematically illustrating embodiments of a method performed in a serving network node.

FIG. 6 is a flow chart schematically illustrating embodiments of a method, performed by a wireless communication network, e.g. the wireless communication network 100, for managing a problem with a first radio link, e.g. the first radio link 121, between a wireless device, e.g. the wireless device 115, and a serving network node, e.g. the serving network node 110, comprised in the wireless communication network 100. When the wireless communication network 100 performs the method it is understood that it is actually one or more network nodes thereof that are performing the method, i.e. it may be performed by distributed nodes. For example, in some embodiment the method is performed by, or via, the serving network node 110, or said one or more network nodes at least involve the serving network node 110. In some embodiments the method, at least one or both of actions 601-602 below, is performed by the managing node 130, e.g. via one or more further network nodes, such as radio network nodes and/or base stations, e.g. the serving network node 110.

The method comprises the following actions, which actions may be taken in any suitable order and/or be carried out fully or partly overlapping in time when this is possible and suitable.

Action 601

The wireless communication network 100 sends first information to the wireless device 115. The first information comprises a first identifier, e.g. tag_s, and informs the wireless device 115 that the first identifier, if received from a candidate network node, e.g. any one of the serving network node 110 and the non-serving network nodes 111a-b, means that the serving network node 110 has authorized setting up a working radio link, without said problem, between the wireless device 115 and said candidate node. The working radio link may e.g. be a repaired version of the first radio link 121 or any one of the second and third radio links 122a-b.

The first information may further inform the wireless device 115 that the first identifier, if received from said candidate network node, means that a context of the first radio link 121 is still valid and thus can be continued to be used for said working radio link.

Moreover, the first information may further comprise another, second, identifier, e.g. tag_p, and may instruct the wireless device 115 to, in response to that a problem with the first radio link 121 has been detected, send a message comprising the second identifier for receipt by one or more candidate network nodes, e.g. any one or more of the serving network node 110 and the non-serving network nodes 111a-b. Said message relates to participation in setting up a working radio link, e.g. a repaired version of the first radio link 121 or any one of the second and third radio links 122a-b, without said problem for the wireless device 115. Said one or more candidate network nodes are network nodes that are candidates for being involved in said working radio link.

This action may fully or partly correspond to one or more of Actions 201a, 301, 401a, 501 described above.

Action 602

The wireless communication network 100 may send second information to one or more non-serving network nodes, e.g. one or both of the non-serving network nodes 111a-b, comprised in the wireless communication network 100. The second information comprises the second identifier and informs said one or more non-serving nodes that the second identifier, in case a problem with the first radio link 121 is detected, may be received in association with a request for participation in setting up a new, working radio link, without said problem, for the wireless device 115.

This action may fully or partly correspond to one or more of Actions 201b, 401b described above.

Action 603

The wireless communication network 100 may receive, from the wireless device 115 in response to that the wireless device 115 has detected the problem with the first radio link 121, a radio link correction request message that comprises the second identifier. The radio link correction request message requests the serving network node 110 to participate in repairing the first radio link 121 in order to make it a working radio link 121 without said problem.

This action may fully or partly correspond to Action 304 described above.

Action 604

The wireless communication network 100 may send, in response to the received radio link correction request message, a radio link correction response message to the wireless device 115. The radio link correction response message comprises the first identifier.

This action may fully or partly correspond to Action 305 described above.

The radio link correction request message in Action 603 and/or the radio link correction response message in the present action may be sent using radio signaling specifically adapted for reaching the serving network node 110 and/or the wireless device 115 despite the detected problem with the first radio link 121.

Action 605

The wireless communication network 100 may detect the problem with the first radio link 121, This action may fully or partly correspond to Action 502 described above.

Action 606

The wireless communication network 100 may send, to the wireless device 115, in response to the detection, a radio link repair request message comprising the first identifier. The radio link repair request message requests the wireless device 115 to participate in repairing the first radio link 121 in order to make it a working radio link 121 without said problem.

The radio link repair request message may be sent using radio signaling specifically adapted for reaching the wireless device 115 despite the detected problem with the first radio link 121.

This action may fully or partly correspond to Action 505 described above.

Action 607

The wireless communication network 100 may send, to one or more non-serving network nodes, e.g. the first and second non-serving network nodes 111*a-b*, in response to the detection, a radio link problem assistance request message. The radio link problem assistance request message comprises the second identifier and is requesting participation in setting up said new, working radio link without said problem for the wireless device 115.

This action may fully or partly correspond to Action 405 described above.

Action 608

The wireless communication network 100 may receive, from a non-serving network node, e.g. the first non-serving network node 111*a*, of said one or more non-serving network nodes, a radio link information request message. The radio link information request message is requesting information about a context of the first radio link 121, which context can continue to be used for a new, working radio link, e.g. any one of the second and third radio links 122*a-b*, between said non-serving radio network node and the wireless device 115.

This action may fully or partly correspond to one or more of Actions 205, 409 described above.

Action 609

The wireless communication network 100 may send, to said non-serving network node 111*a*, in response to the received radio link information request message, a radio link information response message comprising said first identifier and information about said context.

This action may fully or partly correspond to one or more of Actions 206, 410 described above.

Figure 7:
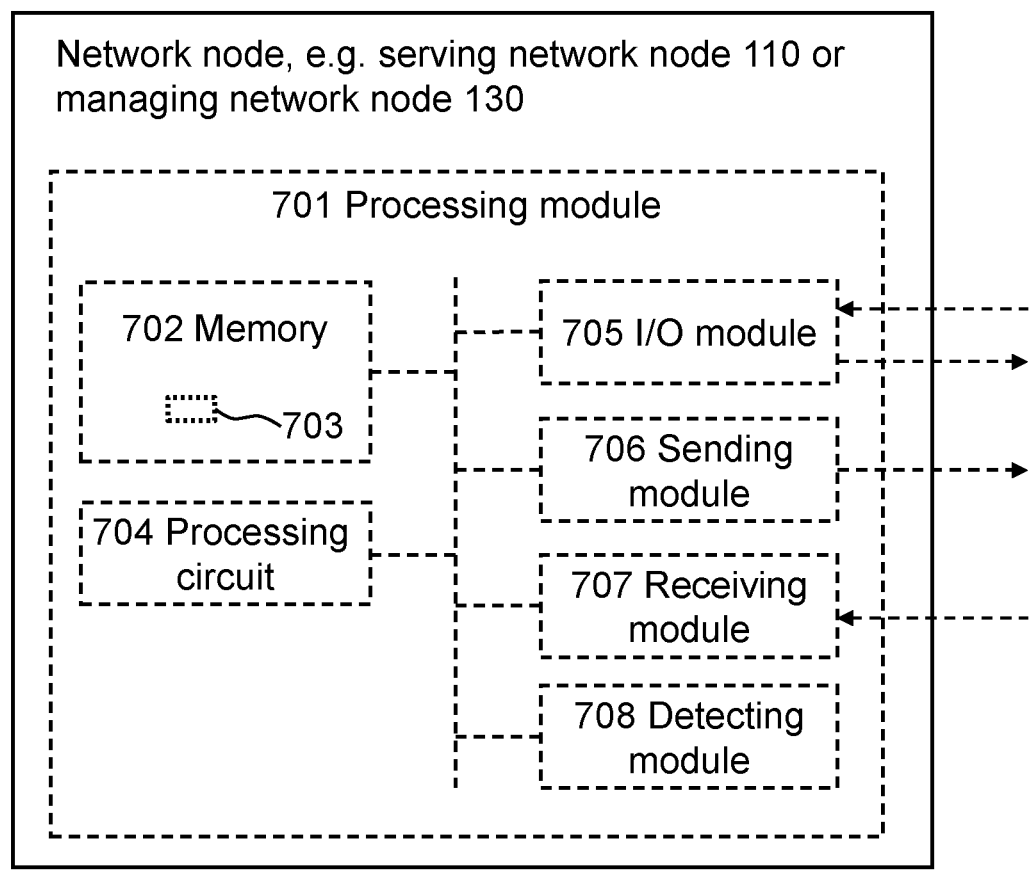
FIG. 7 is a functional block diagram for illustrating embodiments of the serving network node.

FIG. 7 is a schematic block diagram for illustrating embodiments of a network node, e.g. the serving network node 110 or the managing network node 130, for managing a problem with the first radio link 121 between the wireless device 115 and the serving network node 110. The figure is particularly for illustrating how said network node may be configured to perform the method and actions discussed above in connection with FIG. 6. In the following the serving network node is used to exemplify the network node, although another network node, e.g. the managing network node 130, may be configured to perform the method, at least actions corresponding to actions 601-602 above.

The serving network node 110 may comprise a processing module 701, such as a means, one or more hardware modules, including e.g. one or more processors, and/or one or more software modules for performing said methods and/or actions.

The serving network node 110 may further comprise a memory 702 that may comprise, such as contain or store, a computer program 703. The computer program comprises 'instructions' or 'code' directly or indirectly executable by the serving network node 110 so that it performs said methods and/or actions. The memory 702 may comprise one or more memory units and may be further be arranged to store data, such as configurations and/or applications involved in or for performing functions and actions of embodiments herein.

Moreover, the serving network node 110 may comprise a processing circuit 704 as an exemplifying hardware module and may comprise or correspond to one or more processors. In some embodiments, the processing module 701 may comprise, e.g. 'is embodied in the form of' or 'realized by' the processing circuit 704. In these embodiments, the memory 702 may comprise the computer program 703 executable by the processing circuit 704, whereby the serving network node 110 is operative, or configured, to perform said method and/or actions.

Typically the serving network node 110, e.g. the processing module 701, comprises an Input/Output (I/O) module 705, configured to be involved in, e.g. by performing, any communication to and/or from other units and/or nodes, such as sending and/or receiving information to and/or from other external nodes or devices. The I/O module 705 may be exemplified by an obtaining, e.g. receiving, module and/or a providing, e.g. sending, module, when applicable.

In further embodiments, the serving network node 110, e.g. the processing module 701, may comprise one or more of a sending module 706, a receiving module 707, and a detecting module 708 as exemplifying hardware and/or software module(s). In some embodiments, the sending module 706, the receiving module 707, and/or the detecting module 708 may be fully or partly implemented by the processing circuit 704.

Therefore, according to the various embodiments described above, the serving network node 110, and/or the processing module 701 and/or the processing circuit 704 and/or the sending module 706 and/or the I/O module 705, are operative, or configured, to send said first information to the wireless device 115.

Moreover, the serving network node 110, and/or the processing module 701 and/or the processing circuit 704 and/or the sending module 706 and/or the I/O module 705, may be operative, or configured, to send said second information to said one or more non-serving network nodes, e.g.

the first and second non-serving network nodes 111*a*-*b*, comprised in the wireless communication network 100.

Further, the serving network node 110, and/or the processing module 701 and/or the processing circuit 704 and/or the receiving module 707 and/or the I/O module 705, may be operative, or configured, to receive, from the wireless device 115 in response to that the wireless device 115 has detected the problem with the first radio link 121, said radio link correction request message comprising the second identifier. The serving network node 110, and/or the processing module 701 and/or the processing circuit 704 and/or the receiving module 707 and/or the I/O module 705, may be further operative, or configured, to receive the radio link correction request message when it has been sent using radio signaling specifically adapted for reaching the serving network node 110 despite the detected problem with the first radio link 121.

The serving network node 110, and/or the processing module 701 and/or the processing circuit 704 and/or the sending module 706 and/or the I/O module 705, may be further operative, or configured, to send, in response to the received radio link correction request message, said radio link correction response message to the wireless device 115. The serving network node 110, and/or the processing module 701 and/or the processing circuit 704 and/or the sending module 706 and/or the I/O module 705, may be operative, or configured, to send the radio link correction response message using radio signaling specifically adapted for reaching the wireless device 115 despite the detected problem with the first radio link 121.

Furthermore, the serving network node 110, and/or the processing module 701 and/or the processing circuit 704 and/or the detecting module 708, may be operative, or configured, to detect the problem with the first radio link 121. The serving network node 110, and/or the processing module 701 and/or the processing circuit 704 and/or the sending module 706 and/or the I/O module 705, may be further operative, or configured, to send, to the wireless device 115, in response to the detection, said radio link repair request message comprising the first identifier. Moreover, the serving network node 110, and/or the processing module 701 and/or the processing circuit 704 and/or the sending module 706 and/or the I/O module 705, may be further operative, or configured, to send the radio link repair request message using radio signaling specifically adapted for reaching the wireless device 115 despite the detected problem with the first radio link 121.

Additionally, the serving network node 110, and/or the processing module 701 and/or the processing circuit 704 and/or the sending module 706 and/or the I/O module 705, may be operative, or configured, to send, to said one or more non-serving network nodes, e.g. one or more of the first and second non-serving network nodes 111*a*-*b*, in response to the detection, said radio link problem assistance request message comprising the second identifier.

Moreover, the serving network node 110, and/or the processing module 701 and/or the processing circuit 704 and/or the receiving module 707 and/or the I/O module 705, may be operative, or configured, to receive, from said non-serving network node, e.g. the first non-serving network node 111*a*, of said one or more non-serving network nodes, said radio link information request message. The serving network node 110, and/or the processing module 701 and/or the processing circuit 704 and/or the sending module 706 and/or the I/O module 705 may be further operative, or configured, to send, to said non-serving network node, in response to the received radio link information request message, said radio link information response message comprising said first identifier.

Figure 8:
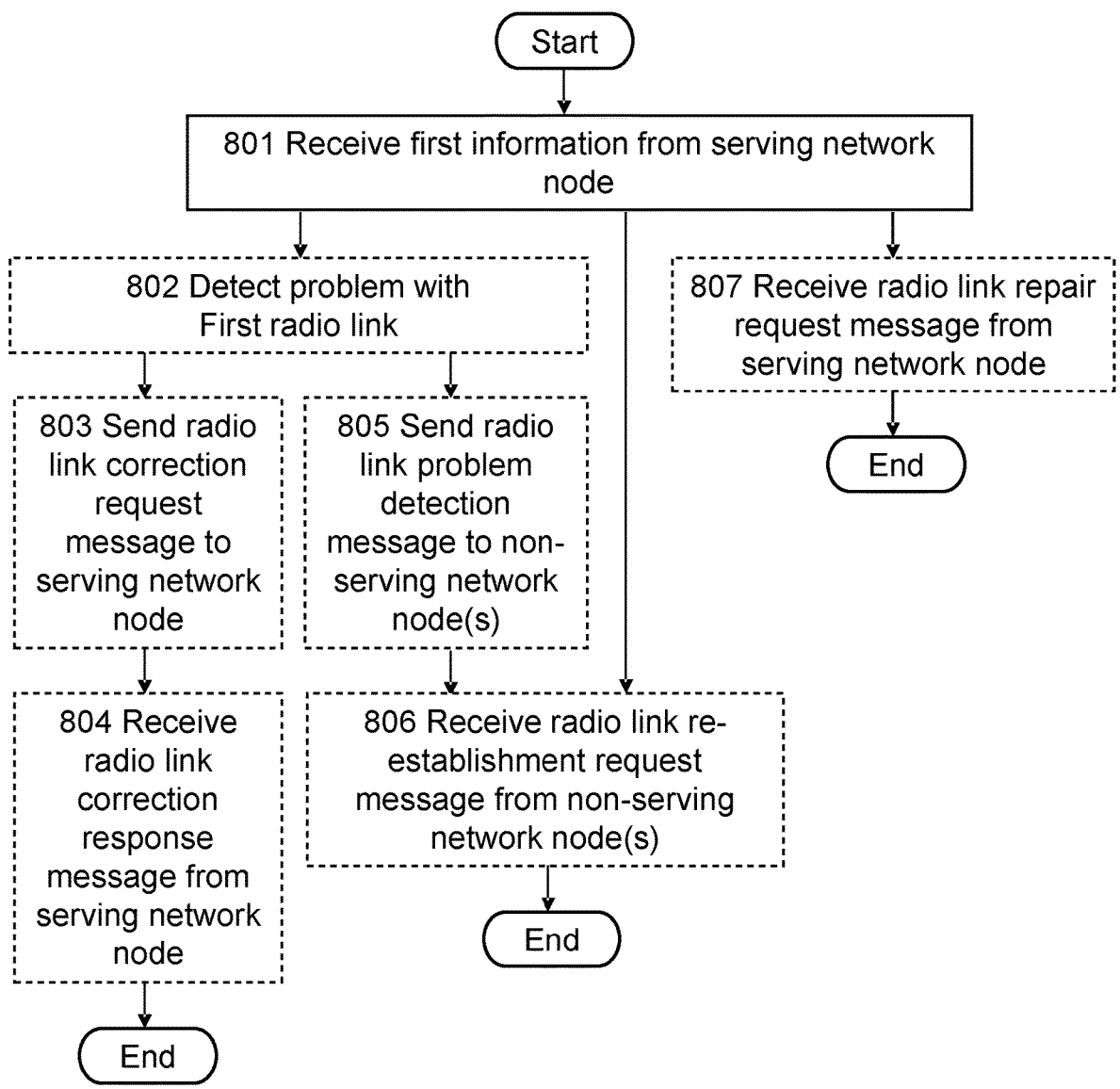
FIG. 8 is a flowchart schematically illustrating embodiments of a method performed in a wireless device.

FIG. 8 is a flow chart schematically illustrating embodiments of a method, performed by a wireless device, e.g. the wireless device 115, for managing a problem with a first radio link, e.g. the first radio link 121, between the wireless device 115, and a serving network node, e.g. the serving network node 110, comprised in the wireless communication network 100.

The method comprises the following actions, which actions may be taken in any suitable order and/or be carried out fully or partly overlapping in time when this is possible and suitable.

Action 801

The wireless device 115 receives first information from the wireless communication network 100. The first information comprises a first identifier, e.g. tag_s, and informs the wireless device 115 that the first identifier, if received from a candidate network node, e.g. any one of the serving network node 110 and the first and second non-serving-network nodes 111*a*-*b*, means that the serving network node 110 has authorized setting up a working radio link, without said problem, between the wireless device 115 and said candidate node. The working radio link may e.g. be a repaired version of the first radio link 121 or any one of the second and third radio links 122*a*-*b*.

The first information may further inform the wireless device 115 that the first identifier, if received from said candidate network node, means that a context of the first radio link 121 is still valid and thus can be continued to be used for said working radio link.

Moreover, the first information may further comprise another, second, identifier, e.g. tag_p, and may instruct the wireless device 115 to, in response to that a problem with the first radio link 121 has been detected, send a message comprising the second identifier for receipt by one or more candidate network nodes, e.g. one or more of the serving network node 110 and the first and second non-serving network nodes 111*a*-*b*. Said message relates to participation in setting up a working radio link, e.g. a repaired version of the first radio link 121 or any one of the second and third radio links 122*a*-*b*, without said problem, for the wireless device 115. Said one or more candidate nodes are network nodes that are candidates for being involved in said working radio link.

This action may fully or partly correspond to one or more of Actions 201*a*, 301, 401*a*, 501 described above.

Action 802

The wireless device 115 may detect the problem with the first radio link 121. This action may fully or partly correspond to Action 302 described above.

Action 803

The wireless device 115 may send, to the serving network node 110 in response to the detection, a radio link correction request message comprising the second identifier. The radio link correction request message is requests the serving network node 110 to participate in repairing the first radio link 121 in order to make it a working radio link, without said problem.

This action may fully or partly correspond to Action 304 described above.

Action 804

The wireless device 115 may receive, in response to the sent radio link correction request message, a radio link correction response message from the serving network node 110, which radio link correction response message comprises the first identifier.

This action may fully or partly correspond to Action 305 described above.

The radio link correction request message in Action 803 and/or the radio link correction response message in the present action may be sent using radio signaling specifically adapted for reaching the serving network node 110 and/or the wireless device 115, despite the detected problem with the first radio link 121.

Action 805

The wireless device 115 may send, to one or more non-serving network nodes, e.g. one or more of the first and second network nodes 111a-b, comprised in the wireless communication network 100, in response to that the wireless device 115 has detected the problem with the first radio link 121, a radio link problem detection message. The radio link problem detection message comprises the second identifier and requests said one or more non-serving network nodes to participate in setting up a new, working radio link, without said problem, for the wireless device 115.

This action may fully or partly correspond to Action 204 described above.

Action 806

The wireless device 115 may receive a radio link re-establishment request message from one or more non-serving network nodes, e.g. one or more of the first and second non-serving network nodes 111a-b, which radio link re-establishment message comprises the first identifier. This action may fully or partly correspond to one or more of Actions 207, 411 described above.

Action 807

The wireless device 115 may receive, from the serving network node 110, in response to detection by the serving radio network node 110 of the problem with the first radio link 121, a radio link repair request message. The radio link repair request message comprises the first identifier and requests the wireless device 115 to participate in repairing the first radio link 121 in order to make it a working radio link 121, without said problem.

This action may fully or partly correspond to Action 505 described above.

Figure 9:
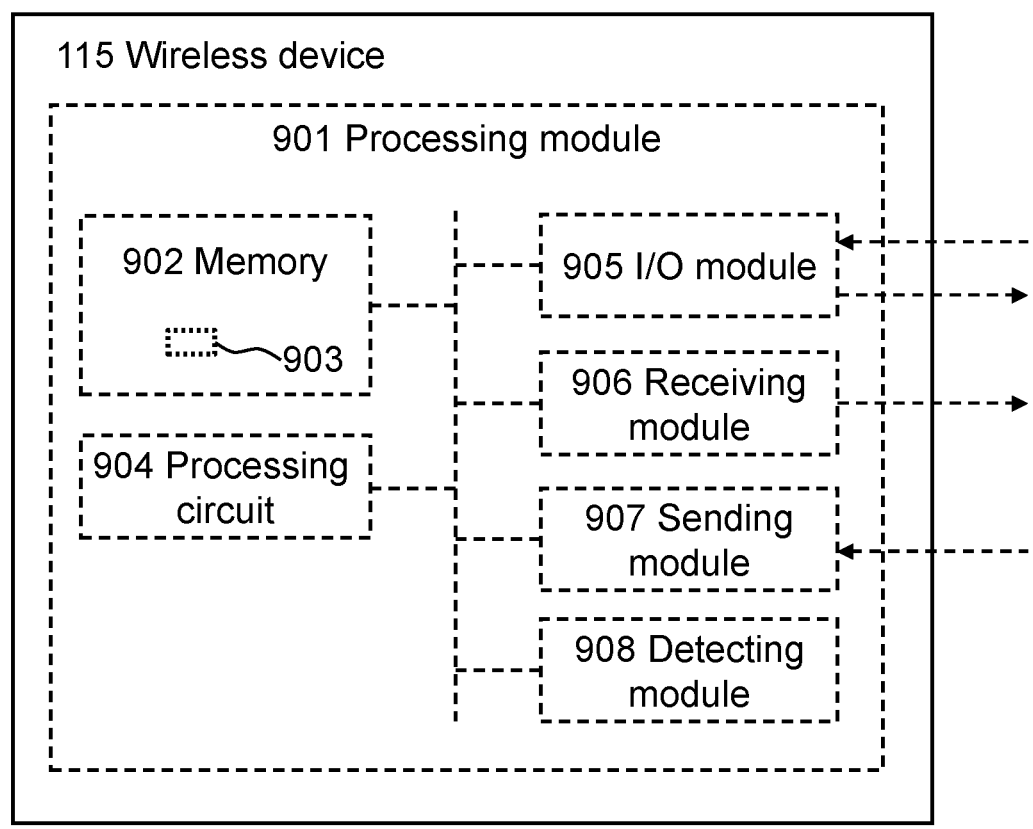
FIG. 9 is a functional block diagram for illustrating embodiments of the wireless device.

FIG. 9 is a schematic block diagram for illustrating embodiments of the wireless device 115 for managing a problem with the first radio link 121 between the wireless device 115 and the serving network node 110 comprised in the wireless communication network 100. The figure is particularly for illustrating how the wireless device 115 may be configured to perform the method and actions discussed above in connection with FIG. 8.

The wireless device 115 may comprise a processing module 901, such as a means, one or more hardware modules, including e.g. one or more processors, and/or one or more software modules for performing said methods and/or actions.

The serving network node 110 may further comprise a memory 902 that may comprise, such as contain or store, a computer program 903. The computer program comprises 'instructions' or 'code' directly or indirectly executable by the wireless device 115 so that it performs said methods and/or actions. The memory 902 may comprise one or more memory units and may be further be arranged to store data, such as configurations and/or applications involved in or for performing functions and actions of embodiments herein.

Moreover, the wireless device 115 may comprise a processing circuit 904 as an exemplifying hardware module and may comprise or correspond to one or more processors. In some embodiments, the processing module 901 may comprise, e.g. 'is embodied in the form of' or 'realized by' the processing circuit 904. In these embodiments, the memory 902 may comprise the computer program 903 executable by the processing circuit 904, whereby the wireless device 115 is operative, or configured, to perform said method and/or actions.

Typically the wireless device 115, e.g. the processing module 901, comprises an Input/Output (I/O) module 905, configured to be involved in, e.g. by performing, any communication to and/or from other units and/or nodes, such as sending and/or receiving information to and/or from other external nodes or devices. The I/O module 905 may be exemplified by an obtaining, e.g. receiving, module and/or a providing, e.g. sending, module, when applicable.

In further embodiments, the wireless device 115, e.g. the processing module 901, may comprise one or more of a receiving module 906, a sending module 907, and a detecting module 908 as exemplifying hardware and/or software module(s). In some embodiments, the receiving module 906, the sending module 907, and/or the detecting module 908 may be fully or partly implemented by the processing circuit 904.

Therefore, according to the various embodiments described above, the wireless device 115, and/or the processing module 901 and/or the processing circuit 904 and/or the receiving module 906 and/or the I/O module 905 are operative, or configured, to receive said first information from the wireless communication network 100.

Further, the wireless device 115, and/or the processing module 901 and/or the processing circuit 904 and/or the detecting module 908 may be operative, or configured, to detect the problem with the first radio link 121.

The wireless device 115, and/or the processing module 901 and/or the processing circuit 904 and/or the sending module 907 and/or the I/O module 905 may be operative, or configured, to send, to the serving network node 110, in response to the detection, said radio link correction request message. The wireless device 115, and/or the processing module 901 and/or the processing circuit 904 and/or the sending module 907 and/or the I/O module 905 may further be operative, or configured, to send the radio link correction request message using radio signaling specifically adapted for reaching the serving network node 110 despite the detected problem with the first radio link 121.

The wireless device 115, and/or the processing module 901 and/or the processing circuit 904 and/or the receiving module 906 and/or the I/O module 905 may be further operative, or configured, to receive, in response to the sent radio link correction request message, said radio link correction response message from the serving network node 110. Moreover, the wireless device 115, and/or the processing module 901 and/or the processing circuit 904 and/or the receiving module 906 and/or the I/O module 905 may be further operative, or configured, to receive the radio link correction response message when it has been sent using radio signaling specifically adapted for reaching the wireless device 115 despite the detected problem with the first radio link 121.

Furthermore, the wireless device 115, and/or the processing module 901 and/or the processing circuit 904 and/or the sending module 907 and/or the I/O module 905 may be operative, or configured, to send, said one or more non-serving network nodes comprised in the wireless communication network 100, in response to that the wireless device 115 has detected the problem with the first radio link 121, said radio link problem detection message.

The wireless device 115, and/or the processing module 901 and/or the processing circuit 904 and/or the receiving module 906 and/or the I/O module 905 may be further operative, or configured, to receive said radio link re-establishment request message from said one or more non-serving network nodes. Additionally, the wireless device 115, and/or the processing module 901 and/or the processing circuit 904 and/or the receiving module 906 and/or the I/O module 905 may be further operative, or configured, to receive, from the serving network node 110, in response to detection by the serving radio network node 110 of the problem with the first radio link 121, said radio link repair request message. The wireless device 115, and/or the processing module 901 and/or the processing circuit 904 and/or the receiving module 906 and/or the I/O module 905 may additionally be operative, or configured, to receive the radio link repair request message when it has been sent using radio signaling specifically adapted for reaching the wireless device 115 despite the detected problem with the first radio link 121.

Figure 10:
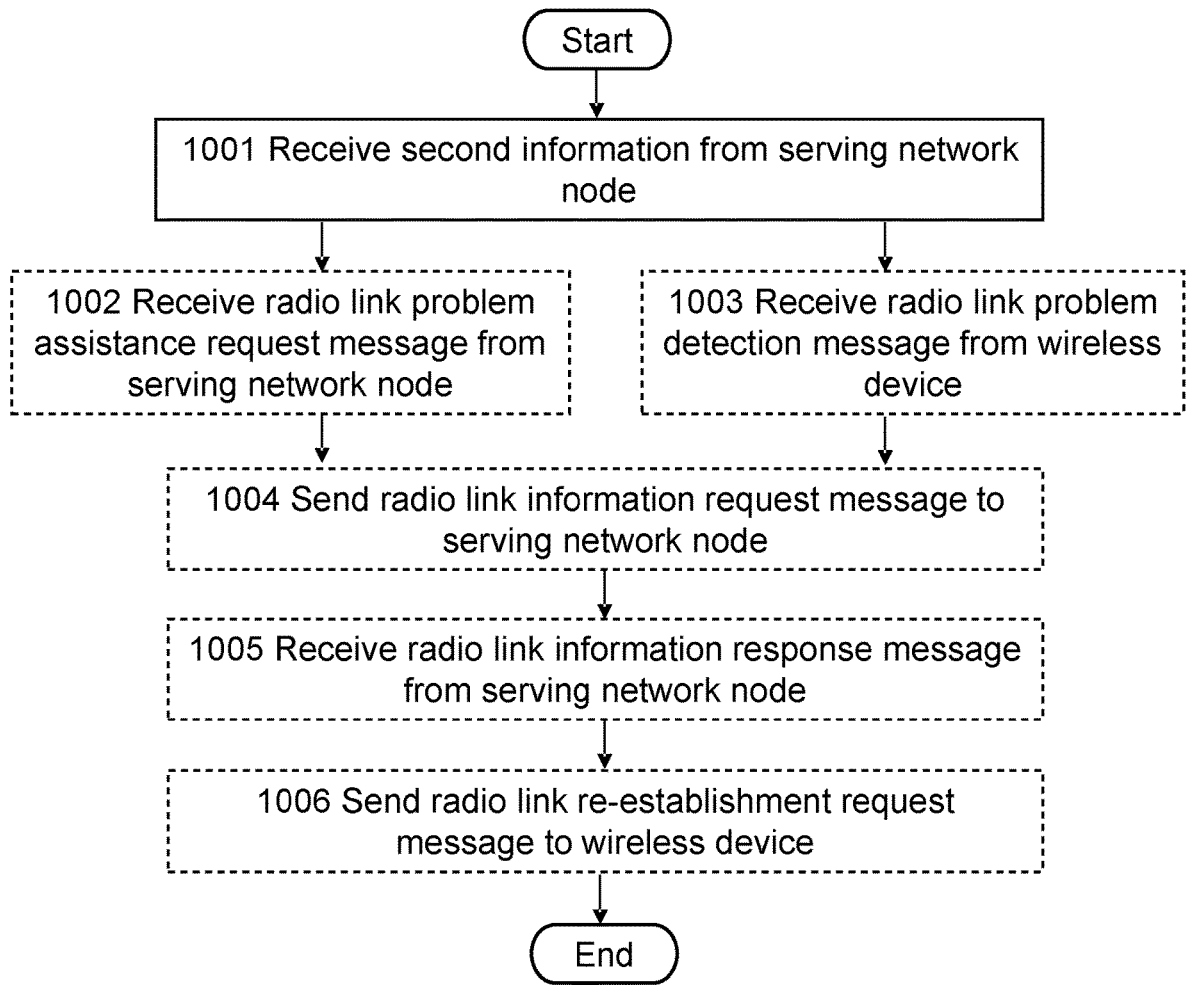
FIG. 10 is a flowchart schematically illustrating embodiments of a method performed in a non-serving network node.

FIG. 10 is a flow chart schematically illustrating embodiments of a method, performed by a non-serving network node, e.g. the first non-serving network node 111a, for managing a problem with a first radio link, e.g. the first radio link 121, between the wireless device 115, and a serving network node, e.g. the serving network node 110. The serving network node and the non-serving network node being comprised in the wireless communication network 100.

The method comprises the following actions, which actions may be taken in any suitable order and/or be carried out fully or partly overlapping in time when this is possible and suitable.

Action 1001

The first non-serving network node 111a receives second information from the serving network node 110. The second information comprises a second identifier, e.g. tag_p, and informs the first non-serving node 111a that the second identifier, in case a problem with the first radio link 121 is detected, may be received in association with a request for participation in setting up a new, working radio link, e.g. the second radio link 122a, without said problem for the wireless device 115.

This action may fully or partly correspond to one or more of Actions 201b, 401b described above.

Action 1002

The first non-serving network node 111a may receive, from the serving network node 110 in response to that the serving network node 110 has detected the problem with the first radio link 121, a radio link problem assistance request message. The radio link problem assistance request message comprises the second identifier and requests participation in setting up said new, working radio link without said problem for the wireless device 115.

This action may fully or partly correspond to Action 405 described above.

Action 1003

The first non-serving network node 111a may further receive, from the wireless device 115, in response to that the wireless device 115 has detected the problem with the first radio link 121, a radio link problem detection message. The radio link problem detection message comprises the second identifier and requests participation in setting up said new, working radio link without said problem for the wireless device 115.

This action may fully or partly correspond to Action 203 described above.

Action 1004

The first non-serving network node 111a may send, to the serving network node 110 in response to the received radio link problem assistance request message or radio link problem detection message, a radio link information request message. The radio link information request message requests information about a context of the first radio link 121, which context can continue to be used for said new, working radio link between the first non-serving radio network node 111a and the wireless device 115.

This action may fully or partly correspond to one or more of Actions 205, 409 described above.

Action 1005

The first non-serving network node 111a may receive from the serving network node 110, in response to the sent radio link information request message, a radio link information response message comprising said first identifier and information about said context.

This action may fully or partly correspond to one or more of Actions 206, 410 described above.

Action 1006

The first non-serving network node 111a may send a radio link re-establishment request message to the wireless device 115, which radio link re-establishment message comprises the first identifier.

This action may fully or partly correspond to one or more of Actions 207, 411 described above.

Figure 11:
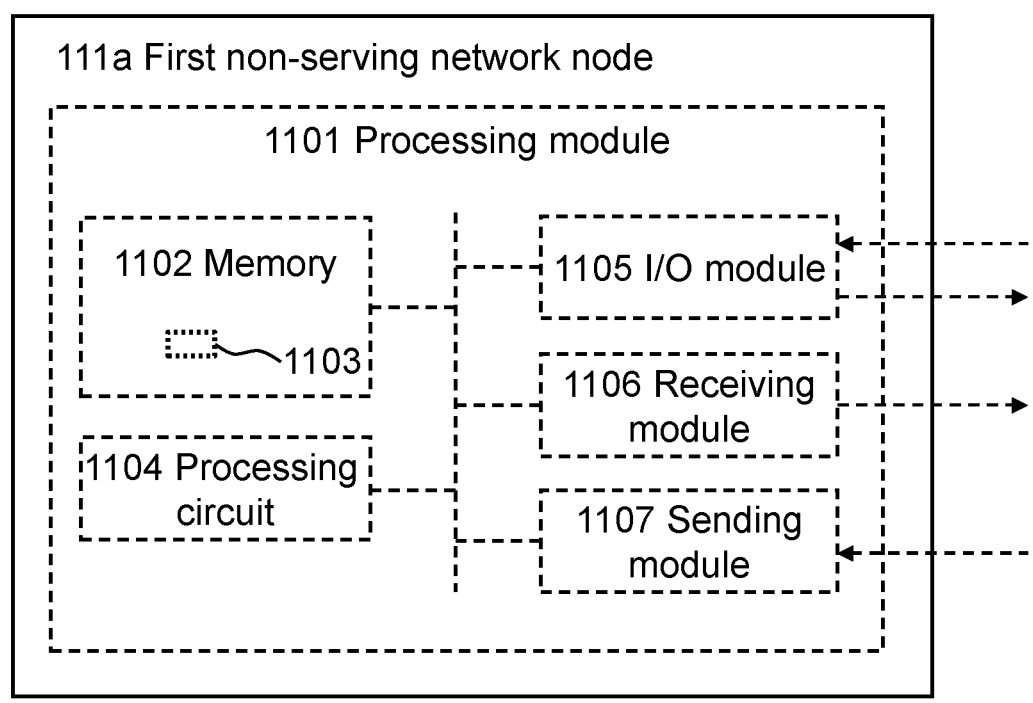
FIG. 11 is a functional block diagram for illustrating embodiments of the non-serving network node.

FIG. 11 is a schematic block diagram for illustrating embodiments of a non-serving network node, in the figure and in the following represented by the first non-serving network node 111a, for managing a problem with the first radio link 121 between the wireless device 115 and the serving network node 110 comprised in the wireless communication network 100. The figure is particularly for illustrating how the first non-serving network node 111a may be configured to perform the method and actions discussed above in connection with FIG. 10.

The first non-serving network node 111a may comprise a processing module 1101, such as a means, one or more hardware modules, including e.g. one or more processors, and/or one or more software modules for performing said methods and/or actions.

The first non-serving network node 111a may further comprise a memory 1102 that may comprise, such as contain or store, a computer program 1103. The computer program comprises 'instructions' or 'code' directly or indirectly executable by the first non-serving network node 111a so that it performs said methods and/or actions. The memory 1102 may comprise one or more memory units and may be further be arranged to store data, such as configurations and/or applications involved in or for performing functions and actions of embodiments herein.

Moreover, the first non-serving network node 111a may comprise a processing circuit 1104 as an exemplifying hardware module and may comprise or correspond to one or more processors. In some embodiments, the processing module 1101 may comprise, e.g. 'is embodied in the form of' or 'realized by' the processing circuit 1104. In these embodiments, the memory 1102 may comprise the computer program 1103 executable by the processing circuit 1104, whereby the first non-serving network node 111a is operative, or configured, to perform said method and/or actions.

Typically the first non-serving network node 111a, e.g. the processing module 1101, comprises an Input/Output (I/O) module 1105, configured to be involved in, e.g. by performing, any communication to and/or from other units and/or nodes, such as sending and/or receiving information to and/or from other external nodes or devices. The I/O module 1105 may be exemplified by an obtaining, e.g. receiving, module and/or a providing, e.g. sending, module, when applicable.

In further embodiments, first non-serving network node 111a, e.g. the processing module 1101, may comprise one or more of a receiving module 1106 and a sending module 1107, as exemplifying hardware and/or software module(s). In some embodiments, the receiving module 1106 and/or the sending module 1107 may be fully or partly implemented by the processing circuit 1104.

Therefore, according to the various embodiments described above, the first non-serving network node 111a, and/or the processing module 1101 and/or the processing circuit 1104 and/or the receiving module 1106 and/or the I/O module 1105 are operative, or configured, to receive said second information from the serving network node 110. Moreover, the first non-serving network node 111a, and/or the processing module 1101 and/or the processing circuit 1104 and/or the receiving module 1106 and/or the I/O module 1105 may be further operative, or configured, to receive, from the serving network node 110, in response to that the serving network node 110 has detected the problem with the first radio link 121, said radio link problem assistance request message. Furthermore, the first non-serving network node 111a, and/or the processing module 1101 and/or the processing circuit 1104 and/or the receiving module 1106 and/or the I/O module 1105 may be further operative, or configured, to receive, from the wireless device 115, in response to that the wireless device 115 has detected the problem with the first radio link 121, said radio link problem detection message.

Further, the first non-serving network node 111a, and/or the processing module 1101 and/or the processing circuit 1104 and/or the sending module 1107 and/or the I/O module 1105 are operative, or configured, to send, to the serving network node 110, in response to the received radio link problem assistance request message or the radio link problem detection message, said radio link information request message.

The first non-serving network node 111a, and/or the processing module 1101 and/or the processing circuit 1104 and/or the receiving module 1106 and/or the I/O module 1105 may be further operative, or configured, to receive, from the serving network node 110, in response to the sent radio link information request message, said radio link information response message.

Moreover, the first non-serving network node 111a, and/or the processing module 1101 and/or the processing circuit 1104 and/or the sending module 1107 and/or the I/O module 1105 are operative, or configured, to send said radio link re-establishment request message to the wireless device 115.

Figure 12A:
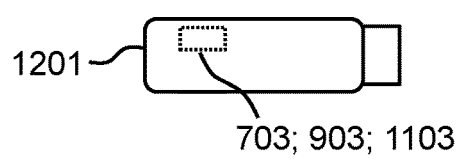
FIGS. 12a-c are schematic drawings illustrating embodiments relating to computer program products and computer programs to cause the serving network node, the wireless device and the non-serving network node to perform method actions.
Figure 12B:
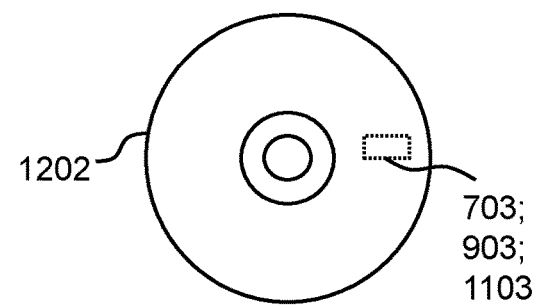
Figure 12C:
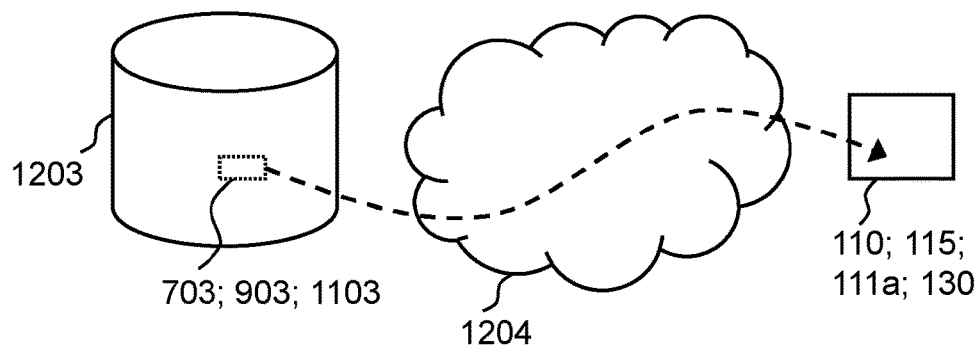

FIGS. 12a-c are schematic drawings illustrating embodiments relating to a computer program that may be any one of the computer programs 703, 903, 1103 and that comprises instructions that when executed by the processing circuits 704, 904, 1104, respectively and/or the processing modules 701, 901, 1101 respectively, causes the network node, e.g. the serving network node 110, and/or the wireless device 115 and/or the first non-serving network node 111a to perform as described above. The serving network node 110 is referred to in the examples below, but, as should be recognized from the above discussion in connection with FIGS. 6-7, the serving network node 110 may in the examples below be replaced by in principle any network node of the wireless communication network 100, e.g. the managing network node 130.

In some embodiments there is provided a data carrier, e.g. a computer program product, comprising any one or both of the computer programs 703, 903, 1103. The data carrier may be one of an electronic signal, an optical signal, a radio signal, and a computer readable medium. Any one, some or all of the computer programs 703, 903, 1103 may thus be stored on the computer readable medium. By data carrier may be excluded a transitory, propagating signal and the data carrier may correspondingly be named non-transitory data carrier. Non-limiting examples of the data carrier being a computer-readable medium is a memory card or a memory stick 1201 as in FIG. 12a, a disc storage medium 1202 such as a CD or DVD as in FIG. 12b, a mass storage device 1203 as in FIG. 12c. The mass storage device 1203 is typically based on hard drive(s) or Solid State Drive(s) (SSD). The mass storage device 1203 may be such that is used for storing data accessible over a computer network 1204, e.g. the Internet or a Local Area Network (LAN).

Any one, some or all of the computer programs 703, 903, 1103 may furthermore be provided as a pure computer program or comprised in a file or files. The file or files may be stored on the computer-readable medium and e.g. available through download e.g. over the computer network 1204, such as from the mass storage device 1203 via a server. The server may e.g. be a web or File Transfer Protocol (FTP) server. The file or files may e.g. be executable files for direct or indirect download to and execution on the serving network node 110 and/or the wireless device 115 and/or the first non-serving network node 111a, to perform as described above, e.g. by any one, some or all of the processing circuits 704, 904, 1104. The file or files may also or alternatively be for intermediate download and compilation involving the same or another processor to make them executable before further download and execution causing the serving network node 110 and/or the wireless device 115 and/or the first non-serving network node 111a to perform as described above.

Note that any processing module(s) mentioned in the foregoing may be implemented as a software and/or hardware module, e.g. in existing hardware and/or as an Application Specific integrated Circuit (ASIC), a field-programmable gate array (FPGA) or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors make the first base station 110 and/or the second base station 111 to be configured to and/or to perform the above-described methods, respectively.

Identification by any identifier herein may be implicit or explicit. The identification may be unique in the wireless communication network 100 or at least in a part or some area thereof.

Note that in practice a network node at the same time implement and be configured to operate according to embodiments for a serving network node and a non-serving network node. Reason is of curse that one and the same network node may be a serving network node for one wireless device and at the same time be a non-serving network node for another wireless device.

The term "network node" as used herein may as such refer to any type of radio network node (described below) or any network node, which may communicate with at least a radio network node. Examples of such network nodes include any radio network node stated above, a core network node, Operations & Maintenance (O&M), Operations Support Systems (OSS), Self Organizing Network (SON) node, positioning node etc. The term "radio network node" as used herein may as such refer to any type of network node serving a wireless device, e.g. UE, and/or that are connected to other network node(s) or network element(s) or any radio node from which a wireless device receives signals. Examples of radio network nodes are Node B, Base Station (BS), Multi-Standard Radio (MSR) node such as MSR BS, eNB, eNodeB, network controller, RNC, Base Station Controller (BSC), relay, donor node controlling relay, Base Transceiver Station (BTS), Access Point (AP), transmission points, transmission nodes, nodes in distributed antenna system (DAS) etc.

Each of the terms "wireless device", "user equipment" and "UE", as used herein, may as such refer to any type of wireless device arranged to communicate with a radio network node in a wireless, cellular and/or mobile communication system, such as the wireless communication system 100, and may thus be referred to as a wireless communication device. Examples include: target devices, device to device UE, device for Machine Type of Communication (MTC), machine type UE or UE capable of machine to machine (M2M) communication, Personal Digital Assistant (PDA), iPAD, Tablet, mobile terminals, smart phone, Laptop Embedded Equipment (LEE), Laptop Mounted Equipment (LME), Universal Serial Bus (USB) dongles etc. While said terms are used frequently herein for convenience, or in the context of examples involving other 3GPP nomenclature, it must be appreciated that the term as such is non-limiting and the teachings herein apply to essentially any type of wireless device. Note that with regard to the downlink, the term "transmitter" may be used herein to refer to a radio network node, e.g. base station, and the term "receiver" may refer to a wireless device.

Note that although terminology used herein may be particularly associated with and/or exemplified by certain cellular communication systems, wireless communication networks etc., depending on terminology used, such as wireless communication networks based on 3GPP, this should as such not be seen as limiting the scope of the embodiments herein to only such certain systems, networks etc.

As used herein, the term "memory" may refer to a hard disk, a magnetic storage medium, a portable computer diskette or disc, flash memory, random access memory (RAM) or the like. Furthermore, the memory may be an internal register memory of a processor.

Also note that enumerating terminology such as first network node, second network node, first base station, second base station, etc., as such should be considering non-limiting and the terminology as such does not imply a certain hierarchical relation. Without any explicit information in the contrary, naming by enumeration should be considered merely a way of accomplishing different names.

As used herein, the expression "configured to" may mean that a processing circuit is configured to, or adapted to, by means of software or hardware configuration, perform one or more of the actions described herein.

As used herein, the terms "number", "value" may be any kind of digit, such as binary, real, imaginary or rational number or the like. Moreover, "number", "value" may be one or more characters, such as a letter or a string of letters. Also, "number", "value" may be represented by a bit string.

As used herein, the expression "in some embodiments" has been used to indicate that the features of the embodiment described may be combined with any other embodiment disclosed herein.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of uni-casting, one specifically addressed device may receive and encode the transmission. In case of group-casting, e.g. multi-casting, a group of specifically addressed devices may receive and decode the transmission.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the present disclosure, which is defined by the appending claims.

The invention claimed is:

1. A method, performed by a wireless communication network, for managing a problem with a first radio link between a wireless device and a serving network node comprised in the wireless communication network, wherein the method comprises:

sending first information to the wireless device in connection with the serving network node becoming the serving network node for the wireless device and prior to the problem being detected, said first information comprising a first identifier and informing the wireless device that the first identifier, if subsequently received from a candidate network node not serving the wireless device at the time the first identifier is subsequently received, means:

the serving network node has authorized setting up a working radio link, without said problem, between the wireless device and said candidate network node; and a context of the first radio link is still valid and thus can continue to be used for the working radio link in the absence of any further signal from the serving network node to the wireless device.

2. The method of claim 1, wherein the method is performed by a network node.

3. A method, performed by a wireless device, for managing a problem with a first radio link between the wireless device and a serving network node comprised in a wireless communication network, wherein the method comprises:

receiving first information from the wireless communication network in connection with the serving network node becoming the serving network node for the wireless device and prior to the problem being detected, said first information comprising a first identifier and informing the wireless device that the first identifier, if subsequently received from a candidate network node not serving the wireless device at the time the first identifier is subsequently received, means:

the serving network node has authorized setting up a working radio link, without said problem, between the wireless device and said candidate network node; and a context of the first radio link is still valid and thus can continue to be used for the working radio link in the absence of any further signal from the serving network node to the wireless device.

4. A method, performed by a non-serving network node, for managing a problem with a first radio link between a wireless device and a serving network node, the serving network node and the non-serving node being comprised in a wireless communication network, wherein the method comprises:

receiving second information from the wireless communication network in connection with the serving network node becoming the serving network node for the wireless device, wherein said wireless device is not served by the non-serving network node, said second information comprising a second identifier and informing the non-serving network node that the second identifier, in case a problem with the first radio link is detected, may be subsequently received in association with a request for participation in setting up a new, working radio link, without said problem, for the wireless device.

5. A network node for managing a problem with a first radio link between a wireless device and a serving network node comprised in the wireless communication network, wherein the network node is configured to:

send first information to the wireless device in connection with the serving network node becoming the serving network node for the wireless device and prior to the problem being detected, said first information comprising a first identifier and informing the wireless device that the first identifier, if subsequently received from a candidate network node not serving the wireless device at the time the first identifier is subsequently received, means:

the serving network node has authorized setting up a working radio link, without said problem, between the wireless device and said candidate network node; and a context of the first radio link is still valid and thus can continue to be used for the working radio link in the absence of any further signal from the serving network node to the wireless device.

6. The network node of claim 5, wherein the first information further comprises another, second, identifier and instructs the wireless device to, in response to that a problem with the first radio link has been detected, send a message comprising the second identifier for receipt by one or more candidate network nodes, which message relates to participation in setting up a working radio link without said problem for the wireless device, said one or more candidate network nodes being network nodes that are candidates for being involved in said working radio link.

7. The network node of claim 6, wherein the network node is further configured to:

send second information to one or more non-serving network nodes comprised in the wireless communication network, said second information comprising the second identifier and informing said one or more non-serving nodes that the second identifier, in case a problem with the first radio link is detected, may be subsequently received in association with a request for participation in setting up a new, working radio link, without said problem, for the wireless device.

8. The network node of claim 7, wherein the network node is further configured to:

detect the problem with the first radio link, and send, to the wireless device, in response to the detection, a radio link repair request message comprising the first identifier, which radio link repair request message is requesting the wireless device to participate in repairing the first radio link in order to make it a working radio link without said problem.

9. The network node of claim 8, wherein the network node is configured to send the radio link repair request message using radio signaling specifically adapted for reaching the wireless device, despite the detected problem with the first radio link.

10. The network node of claim 6, wherein the network node is further configured to:

receive, from the wireless device in response to that the wireless device has detected the problem with the first radio link, a radio link correction request message comprising the second identifier, which radio link correction request message is requesting the serving network node to participate in repairing the first radio link in order to make it a working radio link without said problem, and send, in response to the received radio link correction request message, a radio link correction response message to the wireless device, which radio link correction response message comprises the first identifier.

11. The network node of claim 10, wherein the network node is configured to receive the radio link correction request message when it has been sent using radio signaling specifically adapted for reaching the serving network node, despite the detected problem with the first radio link, and/or to send the radio link correction response message using radio signaling specifically adapted for reaching the wireless device, despite the detected problem with the first radio link.

12. A wireless device for managing a problem with a first radio link between the wireless device and a serving network node comprised in a wireless communication network, wherein the wireless device is configured to:

receive first information from the wireless communication network in connection with the serving network node becoming the serving network node for the wireless device and prior to the problem being detected, said first information comprising a first identifier and informing the wireless device that the first identifier, if subsequently received from a candidate network node not serving the wireless device at the time the first identifier is subsequently received, means:

the serving network node has authorized setting up a working radio link, without said problem, between the wireless device and said candidate network node; and a context of the first radio link is still valid and thus can continue to be used for the working radio link in the absence of any further signal from the serving network node to the wireless device.

13. The wireless device of claim 12, wherein the first information further comprises another, second, identifier and instructs the wireless device to, in response to that a problem with the first radio link has been detected, send a message comprising the second identifier for receipt by one or more candidate network nodes, which message relates to participation in setting up a working radio link, without said problem, for the wireless device, said one or more candidate nodes being nodes that are candidates for being involved in said working radio link.

14. The wireless device of claim 13, wherein the wireless device is further configured to:
- detect the problem with the first radio link, and
- send, to the serving network node in response to the detection, a radio link correction request message comprising the second identifier, which radio link correction request message is requesting the serving network node to participate in repairing the first radio link in order to make it a working radio link, without said problem.

15. The wireless device of claim 14, wherein the wireless device is further configured to:
- receive, in response to the sent radio link correction request message, a radio link correction response message from the serving network node, which radio link correction response message comprises the first identifier.

16. The wireless device of claim 14, wherein the wireless device is configured to send the radio link correction request message using radio signaling specifically adapted for reaching the serving network node, despite the detected problem with the first radio link, and/or to receive the radio link correction response message when it has been sent using radio signaling specifically adapted for reaching the wireless device, despite the detected problem with the first radio link.

17. The wireless device of claim 13, wherein the wireless device is further configured to:
- detect the problem with the first radio link, and
- send, to one or more non-serving network nodes comprised in the wireless communication network, in response to that the wireless device has detected the problem with the first radio link, a radio link problem detection message comprising the second identifier, which radio link problem detection message is requesting said one or more non-serving network nodes to participate in setting up a new, working radio link without said problem for the wireless device.

18. The wireless device of claim 12, wherein the wireless device is further configured to:
- receive a radio link re-establishment request message from one or more non-serving network nodes, which radio link re-establishment message comprises the first identifier.

19. The wireless device of claim 13, wherein the wireless device is further configured to:
- receive, from the serving network node, in response to detection by the serving radio network node of the problem with the first radio link, a radio link repair request message comprising the first identifier, which radio link repair request message is requesting the wireless device to participate in repairing the first radio link in order to make it a working radio link without said problem.

20. A non-serving network node for managing a problem with a first radio link between a wireless device and a serving network node, the serving network node and the non-serving node being comprised in a wireless communication network, wherein the non-serving network node is configured to:
- receive second information from the wireless communication network in connection with the serving network node becoming the serving network node for the wireless device, wherein said wireless device is not served by the non-serving network node, said second information comprising a second identifier and informing the non-serving network node that the second identifier, in case a problem with the first radio link is detected, may be subsequently received in association with a request for participation in setting up a new, working radio link, without said problem, for the wireless device.

21. The non-serving network node of claim 20, wherein the non-serving network node is further configured to:
- receive, from the serving network node in response to that the serving network node has detected the problem with the first radio link, a radio link problem assistance request message comprising the second identifier and requesting participation in setting up said new, working radio link without said problem for the wireless device.

22. The non-serving network node of claim 21, wherein the non-serving network node is further configured to:
- send, to the serving network node in response to the received radio link problem assistance request message or radio link problem detection message, a radio link information request message requesting information about a context of the first radio link, which context can continue to be used for said new, working radio link between the non-serving radio network node and the wireless device.

23. The non-serving network node of claim 20, wherein the non-serving network node is further configured to:
- receive, from the wireless device, in response to that the wireless device has detected the problem with the first radio link, a radio link problem detection message comprising the second identifier, requesting participation in setting up said new, working radio link without said problem for the wireless device.

* * * * *